(12) United States Patent
Moriya

(10) Patent No.: US 11,813,781 B2
(45) Date of Patent: Nov. 14, 2023

(54) METHOD OF MANUFACTURING MOLDED RESIN COMPONENT, MANUFACTURING APPARATUS, AND MOLDED RESIN COMPONENT

(71) Applicant: CANON KABUSHIKI KAISHA, Tokyo (JP)

(72) Inventor: Yuta Moriya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/839,795

(22) Filed: Jun. 14, 2022

(65) Prior Publication Data

US 2022/0410451 A1 Dec. 29, 2022

(30) Foreign Application Priority Data

Jun. 25, 2021 (JP) ................... 2021-105487

(51) Int. Cl.
| | | |
|---|---|---|
| B29C 45/27 | (2006.01) | |
| B29C 45/16 | (2006.01) | |
| B29C 45/28 | (2006.01) | |
| B29C 45/73 | (2006.01) | |
| B29K 25/00 | (2006.01) | |

(52) U.S. Cl.
CPC .......... *B29C 45/16* (2013.01); *B29C 45/2701* (2013.01); *B29C 45/281* (2013.01); *B29C 45/7312* (2013.01); *B29C 2045/1637* (2013.01); *B29C 2045/1693* (2013.01); *B29C 2045/2817* (2013.01); *B29C 2945/76531* (2013.01); *B29K 2025/06* (2013.01)

(58) Field of Classification Search
CPC .............. B29C 45/2701; B29C 45/281; B29C 45/7312
See application file for complete search history.

(56) References Cited

U.S. PATENT DOCUMENTS 11,179,872 B2    11/2021  Moriya et al.

FOREIGN PATENT DOCUMENTS

| JP | 9-94861 A | 4/1997 |
|---|---|---|
| JP | 2000-167882 A | 6/2000 |
| JP | 2003-103567 A | 4/2003 |
| JP | 2003-103577 A | 4/2003 |
| JP | 2013-163267 A | 8/2013 |
| JP | 2017-87641 A | 5/2017 |
| JP | 2017-140754 A | 8/2017 |

*Primary Examiner* — James Sanders
(74) *Attorney, Agent, or Firm* — VENABLE LLP

(57) ABSTRACT

A molded resin component includes a first surface on which a convex portion is formed, and a second surface opposite to the first surface. The convex portion includes a molding mark formed by a valve pin of a manufacturing apparatus that manufactured the molded resin component. A shape of at least a portion of a leading-end surface of the valve pin is not transferred into the molding mark.

9 Claims, 18 Drawing Sheets

METHOD OF MANUFACTURING MOLDED RESIN COMPONENT, MANUFACTURING APPARATUS, AND MOLDED RESIN COMPONENT

BACKGROUND OF THE INVENTION

Field of the Invention

The present invention relates to a method of manufacturing a molded resin component, a manufacturing apparatus for manufacturing the molded resin component, the molded resin component, and the like.

Description of the Related Art

Molded resin components are often used as components with attractive design and exterior components. For example, molded resin components are used as exterior covers of products. Such molded resin components are desired to have a high-quality exterior surface among others because the exterior surface can be seen by a user in normal operation. As a matter of course, if components that cannot be seen by a user in normal operation have high-quality external appearance, they will increase the product value and satisfy the user.

Japanese Patent Application Publication No. 2017-87641 proposes a method for preventing a flow mark (weld line) of synthetic resin from appearing on an exterior surface of a burning-operation component (front-side body) of a gas cooking stove when the burning-operation component (front-side body) is injection-molded. The front-side body includes a disk-shaped body and a conical body. When the front-side body is injection-molded, a hollow-cylinder-shaped gate that communicates with a hot runner is caused to communicate with a leading end portion of a cavity that forms the conical body. In this method, the gate is caused to communicate with the leading end portion of the cavity such that the axis of the gate is aligned with the center axis of the conical body.

However, the present inventor has found that the conventional molded resin components are required to be further improved in quality. An object of the present invention is to provide an advantageous technology that improves the quality of molded resin components.

SUMMARY OF THE INVENTION

According to a first aspect of the present invention, a method of manufacturing a molded resin component by using a manufacturing apparatus includes injecting melted resin from a flow channel into a cavity formed between a first mold and a second mold. The manufacturing apparatus includes the first mold in which the flow channel of melted resin is formed and which is configured to form a first surface of the molded resin component, a second mold configured to form a second surface of the molded resin component opposite to the first surface, and a valve pin configured to move forward and backward in a predetermined direction and open and close the flow channel. A portion of the first mold is located between a leading-end surface of the valve pin and the second mold in the predetermined direction.

According to a second aspect of the present invention, a method of manufacturing a molded resin component by using a manufacturing apparatus includes keeping a temperature of an area of a molding surface of a second mold, below a glass transition point of a material of the molded resin component when melted resin is injected from a flow channel into a cavity formed between a first mold and the second mold. The manufacturing apparatus includes the first mold in which the flow channel of melted resin is formed and which is configured to form a first surface of a molded resin component, and the second mold configured to form a second surface of the molded resin component opposite to the first surface. The area faces the flow channel.

According to a third aspect of the present invention, a manufacturing apparatus configured to manufacture a molded resin component includes a first mold in which a flow channel of melted resin is formed and which is configured to form a first surface of a molded resin component, a second mold configured to form a second surface of the molded resin component opposite to the first surface, and a valve pin configured to move forward and backward in a predetermined direction and open and close the flow channel. A portion of the first mold is disposed between a leading-end surface of the valve pin and the second mold in the predetermined direction. The leading-end surface of the valve pin is located on a side of a cavity formed between the first mold and the second mold.

According to a fourth aspect of the present invention, a molded resin component includes a first surface on which a convex portion is formed, and a second surface opposite to the first surface. The convex portion includes a molding mark formed by a valve pin of a manufacturing apparatus that manufactured the molded resin component. A shape of at least a portion of a leading-end surface of the valve pin is not transferred into the molding mark.

Further features of the present invention will become apparent from the following description of exemplary embodiments with reference to the attached drawings.

DESCRIPTION OF THE EMBODIMENTS

Figure 1:
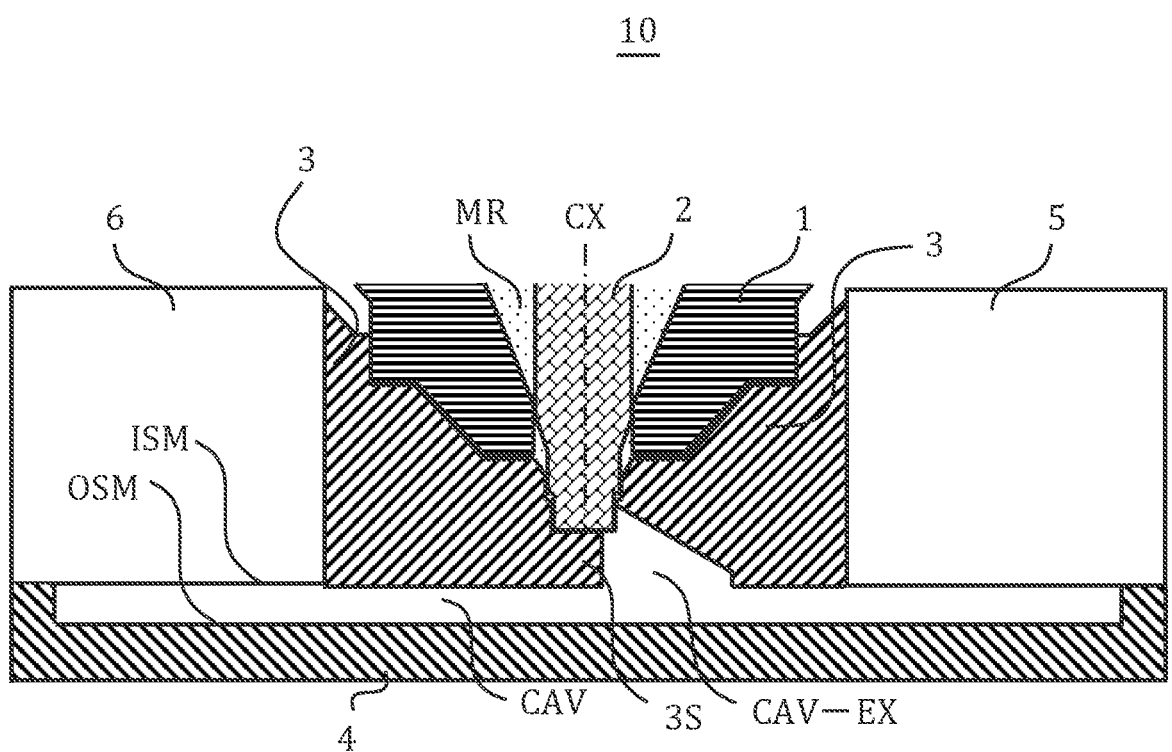
FIG. 1 is a schematic cross-sectional view of an injection molding apparatus of a first embodiment.

Hereinafter, a molded resin component, a method of manufacturing the molded resin component, a resin molding apparatus, and the like of embodiments of the present invention will be described with reference to the accompanying drawings. Note that since the embodiments and examples described below are examples, detailed configurations and the like may be modified as appropriate by a person skilled in the art, without departing the spirit of the present invention.

In addition, in the drawings referred to in the below-described embodiments, a component given an identical reference numeral has an identical function, unless otherwise specified.

Quality of Molded Resin Components

First, the quality of molded resin components will be described. When a molded resin component is injection-molded, a mark (gate mark) of a gate that injects melted resin into a cavity may be formed on the molded resin component. Thus, increasing the quality of external appearance of a surface of a molded resin component on which no gate mark is formed is effective for increasing the quality of the molded resin component. In the following description, the surface of a molded resin component on which no gate mark is formed is referred to as an exterior surface, and a surface of the molded resin component on which a gate mark is formed is referred to as a non-exterior surface. The exterior surface is a surface whose quality is required to be improved. However, the surface of a molded resin component on which a gate mark is formed may be seen. In addition, the exterior surface of a molded resin component, whose quality is required to be improved, may be a surface that is not seen in normal operation by a user of the product that includes the molded resin component.

The present inventor has found that in a case where the gate, which communicates with the hot runner, is disposed at a position in a cavity on a side of a resin component (to be molded) opposite to the exterior surface of the resin component, a local area of the exterior surface of the molded resin component may give a feeling of gloss different from that given by an area around the local area, and may deteriorate the quality of the exterior surface. The local area, which gives the different feeling of gloss, is different in nature from the flow mark (weld line), and thus the formation of the local area cannot be prevented by the method described in Japanese Patent Application Publication No. 2017-87641.

The present inventor, however, has studied a method that suppresses the formation of the local area that gives a feeling of gloss different from that given by an area around the local area, in the case where the gate, which communicates with the hot runner, is disposed at a position in a cavity on a side of a resin component (to be molded) opposite to the exterior surface of the resin component.

First, the reason that the local area, whose gloss (or color) is visually recognized different from that of an area around the local area, is formed in an exterior surface of a molded resin component will be described. Note that in the following description, the local area, whose gloss (or color) is visually recognized different from that of an area around the local area, is referred to as a different-gloss area, for convenience.

The different-gloss area is an area that causes a defect in external appearance that is different from the defect caused by the flow mark (weld line), which is known. The present inventor has found that the different-gloss area is formed in a position of an exterior surface of a molded resin component, opposite to a position at which the hot-runner gate is disposed, that is, opposite to an injection inlet that injects melted resin into a cavity. In addition, the present inventor has compared the state of the different-gloss area with the state of an area of the exterior surface around the different-gloss area, and has found that there is no significant difference between the material composition of the resin solidified in the different-gloss area and the material composition of the resin solidified in the area around the different-gloss area. However, the present inventor has found that the surface structure observed microscopically differs between the different-gloss area and the area around the different-gloss area, and that the difference in the microscopic surface structure causes the difference in the feeling of gloss (or color), which is visually recognized by a user. For studying the cause of the difference in the microscopic surface structure, the present inventor examined a transfer surface of a mold that corresponds to the different-gloss area, and another transfer surface around the above-described transfer surface. However, it was confirmed that there is no significant difference in flatness (or surface roughness) between both of the transfer surfaces.

Thus, the present inventor focused the attention on the fact that the different-gloss area is formed in a fixed position although the flatness (or surface roughness) does not differ between the transfer surfaces of the mold, and has found that the different-gloss area is caused by the difference in transfer performance for transferring the shape of a surface of the mold. Specifically, on a portion of the mold that faces the gate, the melted resin immediately after injected from the hot runner and having high temperature continuously flows in a period of time from when the injection of the melted resin is started, until when the filling of the resin into the cavity is completed. Thus, the portion of the mold has a relatively higher temperature than that of the surface of the mold around the portion. For this reason, a surface of the mold located at a position that faces the gate has higher transfer performance (fidelity) of surface shape, than that of another surface of the mold around the surface. In contrast, the other surface of the mold has a lower temperature, and thus has a relatively lower transfer performance (fidelity) of surface shape. As a result, the surface shape of a molding surface of the mold is transferred to the different-gloss area with high fidelity, and the surface shape of another molding surface of the mold around the molding surface is transferred to another area around the different-gloss area with relatively low fidelity, so that the different microscopic surface structures are formed on the surface of the molded resin component.

Based on the above-described findings, the present inventor has invented a technology that reduces the difference in the temperature distribution of the surface of the mold, whose shape is to be transferred to the exterior surface, and that can suppress the occurrence of the different-gloss area. In a desirable embodiment for a manufacturing method, the surface of the mold, whose shape is to be transferred to the exterior surface, is prevented from having an area whose temperature is equal to or larger than a glass transition point (Tg) of the resin material, by devising the shape of a flow channel of the melted resin that is defined by a gate bush. In a desirable embodiment for a molded resin component, the molded resin component includes a convex portion formed on a side of the molded resin component opposite to an exterior surface of the molded resin component, and the convex portion has a contact mark formed when the convex portion was in contact with a portion of a leading end portion of a valve pin that opens and closes the gate. The portion of the leading end portion of the valve pin is a portion that does not include the central axis of the valve pin.

First Embodiment

FIG. 1 is a schematic cross-sectional view of a manufacturing apparatus of an injection-molded product of a first embodiment. The manufacturing apparatus of an injection-molded product is an injection molding apparatus 10 that includes an injection molding machine and a mold. The injection molding machine includes an injection unit and a mold clamping unit, and the mold is mounted on the mold clamping unit. FIG. 1 illustrates the mold of the injection molding apparatus 10. The manufacturing apparatus is not limited to a combination of the injection molding machine and the mold, and a configuration including an injection molding machine alone or a configuration including a mold alone can also be called a manufacturing apparatus. The injection molding apparatus 10 that serves as a mold includes a resin nozzle 1, a valve pin 2, a gate bush 3, a movable mold 4, a fixed piece 5, and a fixed piece 6. For example, the resin nozzle 1 is a member formed like a hollow cylinder and made of metal, and serves as a supply path for supplying melted resin MR into a cavity CAV. The resin nozzle 1 is connected to the gate bush 3. The cavity CAV defines the shape of a molded resin component, and is formed by the movable mold 4, the fixed piece 5, the fixed piece 6, and the gate bush 3. For example, the movable mold 4, the fixed piece 5, the fixed piece 6, and the gate bush 3 are made of a material, such as pre-hardened steel. The cavity CAV includes a cavity portion CAV-EX defined by the gate bush 3. Of mold surfaces that define the cavity CAV, a mold surface OSM (second surface) of the movable mold 4 forms the exterior surface of a molded resin component through transfer. In addition, a mold surface ISM (first surface) of the fixed piece 5, the fixed piece 6, and the gate bush 3, and the leading end portion of the valve pin 2 form the non-exterior surface of the molded resin component opposite to the exterior surface, through transfer.

The mold surface OSM of the movable mold 4, which forms the exterior surface of a molded resin component through transfer, may be decorated for giving aesthetic appearance to the molded resin component. Note that giving the aesthetic design to the molded resin component includes transferring grain pattern (concave and convex pattern) or mirror surface to the exterior surface of the molded resin component. Specifically, the mold surface OSM may include an area having a pattern to be transferred to the exterior surface of the molded resin component. Examples of the pattern include a concave and convex pattern, such as a pear skin pattern, a mat finish, a hairline pattern, a lattice-like pattern, a wood-grain pattern, or a leather pattern, and a mirror surface. By performing injection molding with a combination of the mold and an appropriately selected resin material, a piano-black, metallic, or marble exterior surface can be formed on a molded resin component.

The components (i.e., the fixed pieces 5 and 6, and the gate bush 3), other than the valve pin 2, used for forming the non-exterior surface through transfer are collectively referred to as a fixed mold or a non-exterior surface forming mold (first mold). The component (i.e., the movable mold 4) used for forming the exterior surface through transfer is referred to as an exterior surface forming mold (second mold). Note that although the non-exterior surface forming mold (fixed mold) includes the plurality of components (i.e., the fixed pieces 5 and 6, and the gate bush 3) in this disclosure, the non-exterior surface forming mold may be a one-body component. In addition, although the exterior surface forming mold is the single component (i.e., the movable mold 4) in this disclosure, the exterior surface forming mold may include a plurality of components.

By the way, as a mold for injecting thermoplastic resin such as plastic and forming a molded resin component, a cold-runner mold and a hot-runner mold are known. The cold-runner mold has an advantage of having a simple structure, but the resin solidified in the runner will be wasted as waste material. Thus, for increasing economy and reducing environmental load, it is desired to use the hot-runner mold that produces less resin waste. In the hot-runner mold, all the runner portion is heated. Thus, if the hot-runner mold is used, resin components can be molded, with almost no resin waste being produced. In the hot-runner mold, the resin tends to have a higher temperature in the vicinity of the gate. Thus, the present embodiment is especially suitable for manufacturing molded resin components by using the hot-runner mold.

In a first example, the mold of the injection molding apparatus 10 is a hot-runner mold, and the resin nozzle 1 is a hot-runner nozzle used in the hot-runner mold. A hot-runner bush of the hot-runner mold may serve also as the gate bush 3. In a second example, the mold of the injection molding apparatus 10 is a cold-runner mold, and the resin nozzle 1 is an injection nozzle of an injection unit of an injection molding machine. A sprue bush of the cold-runner mold may serve also as the gate bush 3.

In the resin nozzle 1, the valve pin 2 moves forward and backward in the vertical direction in FIG. 1. With this operation, the resin nozzle 1 opens and closes a flow channel of melted resin that extends from the resin nozzle 1 to the cavity CAV. The direction (i.e., up and down direction in FIG. 1) in which the valve pin 2 moves forward and backward when the valve pin 2 opens and closes the flow channel is referred to as a forward and backward direction or a predetermined direction. When the valve pin 2 moves toward an upward direction of FIG. 1 and retracts in the resin nozzle 1, the melted resin MR is injected from the resin nozzle 1 into the cavity CAV, and the hot-runner gate becomes an opened state. As illustrated in FIG. 1, when the valve pin 2 moves downward, or forward, and is abutted against the gate bush 3, the flow channel of the melted resin MR extending from the resin nozzle 1 to the cavity CAV is closed, and the gate becomes a closed state. In the present embodiment, the leading end portion of the valve pin 2 has a cylindrical shape whose cross-sectional shape is a circle in a direction orthogonal to the axis of the valve pin 2. Note that the leading end portion of the valve pin 2 may be a portion that projects from the leading end of the resin nozzle 1 when the valve pin 2 moves forward, that is, a portion that is located outside the resin nozzle 1 when the valve pin 2 moves forward. The leading-end surface of the valve pin 2 is a surface of the leading end portion (including the outermost end) of the valve pin 2. The outermost end of the valve pin 2 may be a point, a line, or a surface. In the present embodiment, the outermost end of the valve pin 2 is a circular surface.

Note that since FIG. 1 is a schematic diagram, the components of the apparatus are not necessarily illustrated with accurate scale. In addition, the configuration of the injection molding apparatus 10 of the present embodiment is not limited to the example illustrated in FIG. 1. For example, the movable mold or the fixed mold may be constituted by a plurality of detachable pieces, and the injection molding apparatus 10 may include an ejector pin used for releasing a solidified molded resin component from the mold.

Next, a method of manufacturing molded resin components by using the injection molding apparatus 10 will be described. FIGS. 2A to 2B and 3A to 3B are schematic cross-sectional views for illustrating processes of the manufacturing method, and in the figures, the gate bush 3 of the injection molding apparatus 10 and its surroundings are enlarged.

Figure 2A:
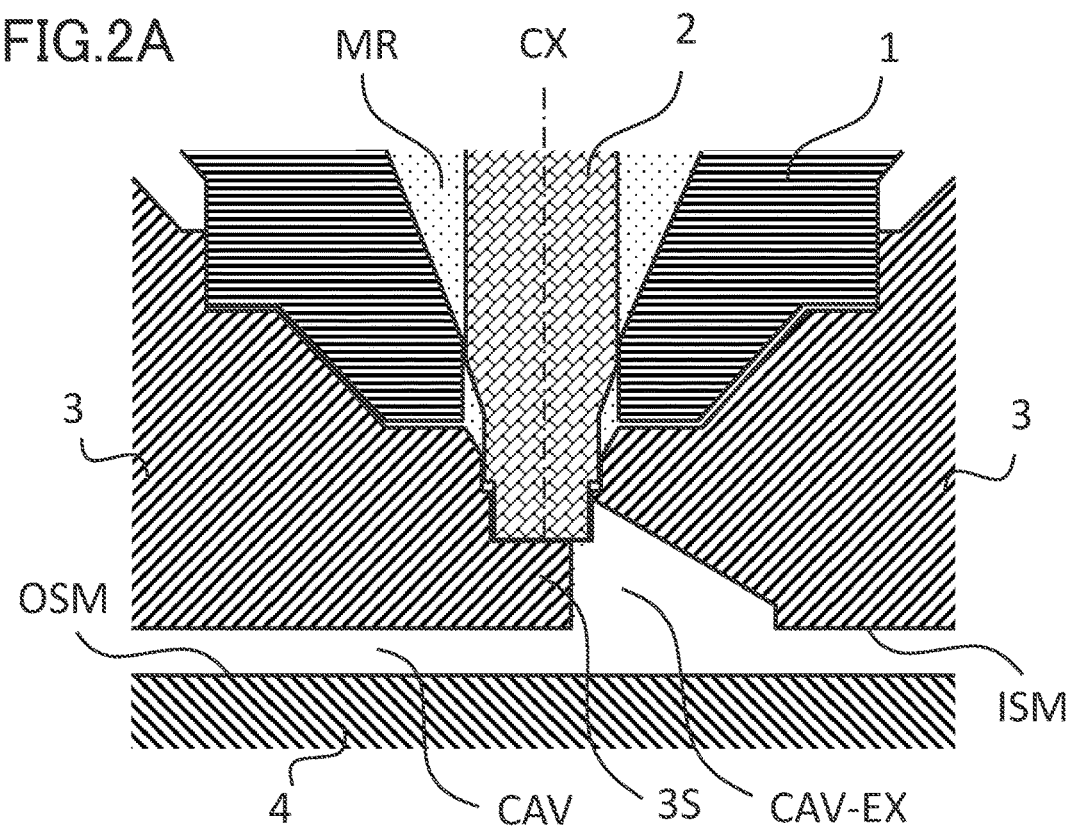
FIG. 2A is a diagram illustrating a state where a hot runner gate is closed in the first embodiment.

FIG. 2A illustrates a state (gate-closed state) in which the flow channel of the melted resin MR extending from the resin nozzle 1 to the cavity CAV is closed by the valve pin 2 moving downward and being abutted against the gate bush 3 before the injection molding is started. In the injection molding apparatus of the present embodiment, a portion 3S that is a portion of the gate bush 3 is disposed on an extension line extending in the direction in which the valve pin 2 moves forward and backward. Thus, the portion 3S of the gate bush 3, which is a portion of the non-exterior surface forming mold, is positioned between the leading-end surface of the valve pin 2 and the exterior surface forming mold (i.e., the movable mold 4) in the forward and backward direction of the valve pin 2. More specifically, the portion 3S that is a portion of the gate bush 3 is disposed on the extension line of a central axis CX. In other words, since the central axis CX of the valve pin 2 is equal to the central axis of the resin nozzle 1, the portion 3S of the gate bush 3 is disposed on the extension line of the central axis of the resin nozzle 1. Thus, in the gate-closed state, a portion of the leading end portion of the valve pin 2 through which the central axis of the valve 2 passes is in contact with the portion 3S of the gate bush 3, and the portion of the leading end portion of the valve pin 2 through which the central axis of the valve 2 passes is not exposed to the cavity CAV. The distance between the leading-end surface of the valve pin 2 located when the flow channel of the melted resin MR is closed and the exterior surface forming mold (second mold) is equal to or larger than 2.5 mm and equal to or smaller than 15 mm.

Figure 2B:
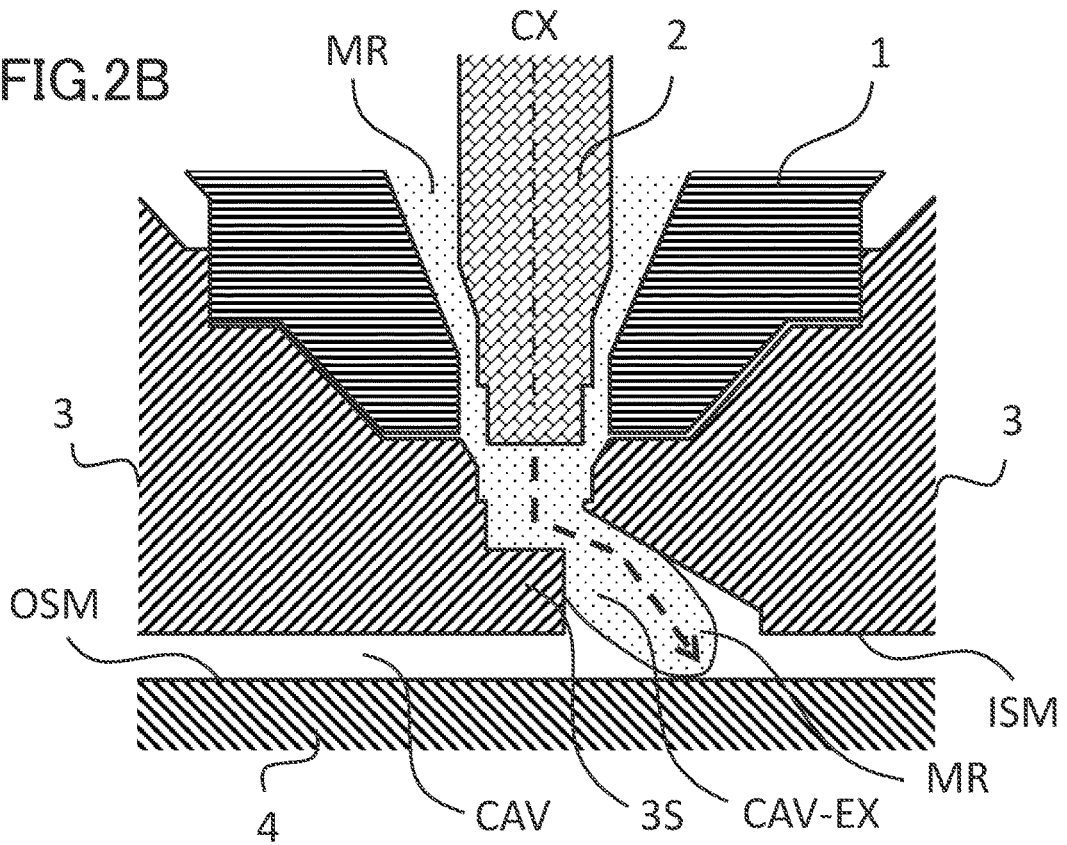
FIG. 2B is a diagram illustrating a state where the hot runner gate is opened in the first embodiment.

FIG. 2B illustrates an early stage (gate-opened state) in which the injection of the melted resin MR from the resin nozzle 1 into the cavity CAV is started by the valve pin 2 retracting in the resin nozzle 1 and being separated from the gate bush 3. The melted resin MR is injected from the resin nozzle 1 into the flow channel formed in the gate bush 3. However, the portion 3S of the gate bush 3 is disposed on the extension line of the central axis CX of the valve pin 2. Thus, the melted resin MR cannot move along the shortest distance from the exit of the resin nozzle 1 to the mold surface OSM. Specifically, the flow direction of the melted resin MR is changed by the portion 3S, and then the melted resin MR flows into the cavity portion CAV-EX. The melted resin MR flows in a curved flow channel because the melted resin MR flows through the cavity portion CAV-EX. While the melted resin MR flows through the curved flow channel, the heat of the melted resin MR is drawn by the gate bush 3, so that the temperature of the melted resin MR decreases from the temperature of the melted resin MR stored in the resin nozzle 1. That is, the melted resin MR reaches the mold surface OSM that forms an exterior surface of a molded resin component through transfer, after the temperature of the melted resin MR decreases.

Figure 3A:
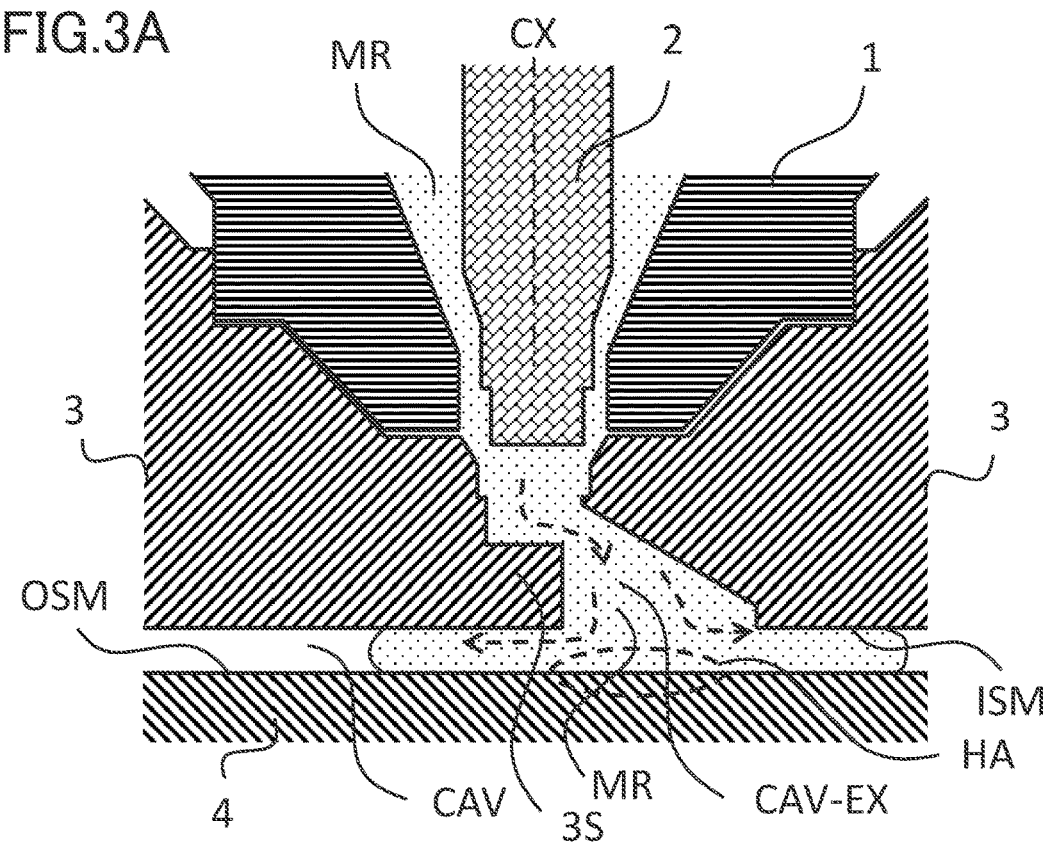
FIG. 3A is a diagram illustrating a stage where resin is continuously injected from a resin nozzle 1 into a cavity CAV in the first embodiment.

FIG. 3A illustrates a stage in which the melted resin MR is continuously injected, after the state of FIG. 2B, from the resin nozzle 1 into the cavity CAV. In the present embodiment, the melted resin MR reaches the mold surface OSM after the melted resin MR flows through the cavity portion CAV-EX and the temperature of the melted resin MR decreases. Thus, even in an area HA that is closest to the gate exit, the temperature of the mold surface OSM that forms an exterior surface of a molded resin component through transfer is kept below a glass transition point (Tg) of the resin material. Note that the temperature of the other portion of the mold surface OSM, other than the area HA, is also kept below the glass transition point (Tg).

Figure 3B:
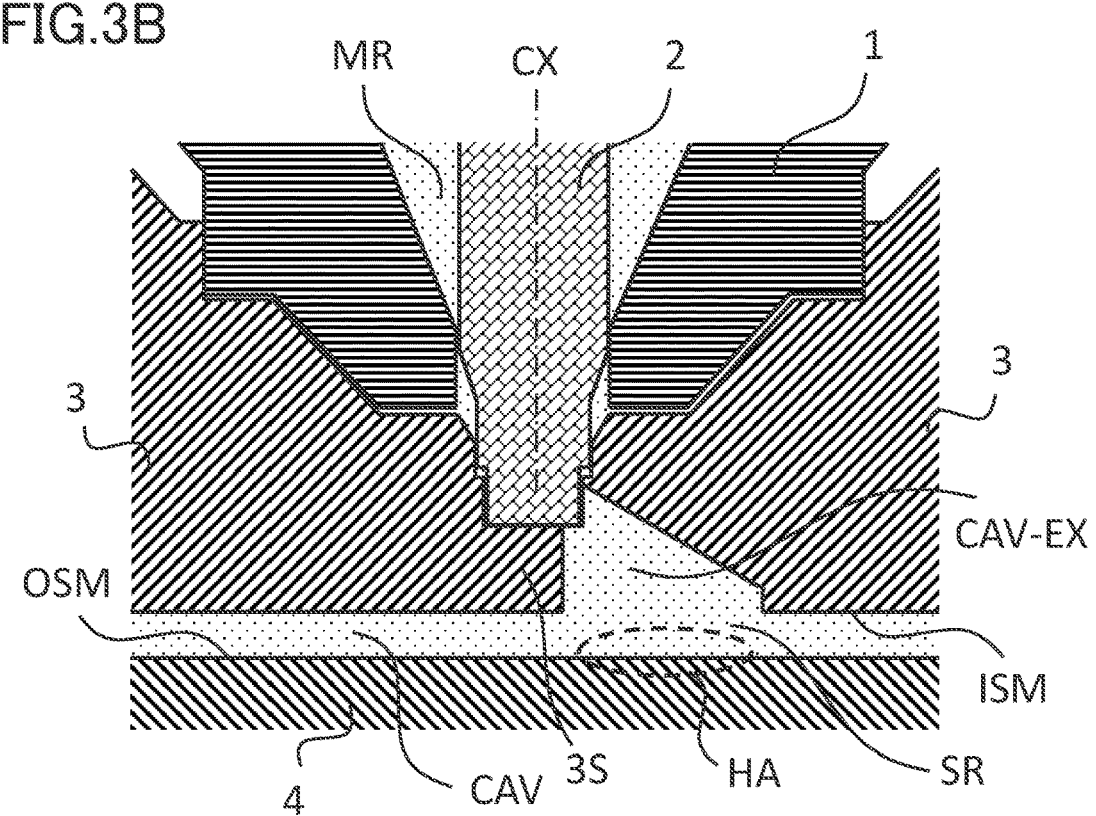
FIG. 3B is a diagram illustrating a stage where the filling of the resin into the cavity CAV is completed and the resin is solidified in the first embodiment.

FIG. 3B illustrates a state (gate-closed state) in which the flow channel is closed by the valve pin 2 moving downward and being abutted against the gate bush 3 after the filling of the resin into the cavity CAV is completed. The distance between the leading-end surface of the valve pin 2 located when the flow channel of the melted resin MR is closed and the exterior surface forming mold (second mold) is equal to or larger than 2.5 mm and equal to or smaller than 15 mm. The melted resin that has filled the cavity CAV is cooled and solidified by the mold, and becomes a solidified resin SR. As described above, the temperature of the mold surface OSM that forms an exterior surface of a molded resin component through transfer is kept below the glass transition point of the resin material. Thus, in the mold surface OSM, the transfer performance of surface shape (fidelity of transfer) does not significantly differ between the area HA, which is closest to the gate exit, and an area around the area HA. Consequently, the flatness (or surface roughness) of the surface of the solidified resin SR hardly differs between the area HA, which is closest to the gate exit, and an area around the area HA.

In the present embodiment, at least two methods are used for keeping the temperature of the area HA below the glass transition point (Tg) of the resin material. In a first method, the portion 3S of the gate bush 3 is disposed for preventing the resin stored in the resin nozzle 1 and having a high temperature (for example, equal to or larger than the glass transition point), from flowing from a position directly below the resin nozzle 1 (i.e., a position directly below the valve pin 2) to the mold surface OSM at the shortest distance. In a second method, the melted resin MR is forced to flow through the cavity portion CAV-EX, so that the temperature of the melted resin MR decreases while the melted resin MR flows through the curved flow channel. However, the method of keeping the temperature of the area HA below the glass transition point (Tg) of the resin material is not limited to the first and the second methods. For example, in another method, the temperature of the resin stored in the resin nozzle 1 may be kept at a lower temperature sufficient to keep the temperature of the area HA below the glass transition point (Tg) of the resin material. In still another method, a temperature maintaining mechanism (cooling mechanism) may be disposed in the exterior surface forming mold (i.e., the movable mold 4) for suppressing the temperature rise of the area HA.

After the resin in the cavity CAV hardens, the cavity CAV is opened by moving the movable mold 4 in a downward direction, which is defined in the figures. In addition, the solidified resin SR (molded resin component) that is in close contact with the fixed piece 5, the fixed piece 6, the gate bush 3, and the valve pin 2 is pushed out in the downward direction by using an ejector pin (not illustrated), so that the solidified resin SR is released from the mold.

Thus, the molded resin component is formed through a series of above-described processes, and a plurality of molded resin components can be mass-produced by repeating the above-described processes.

Figure 4A:
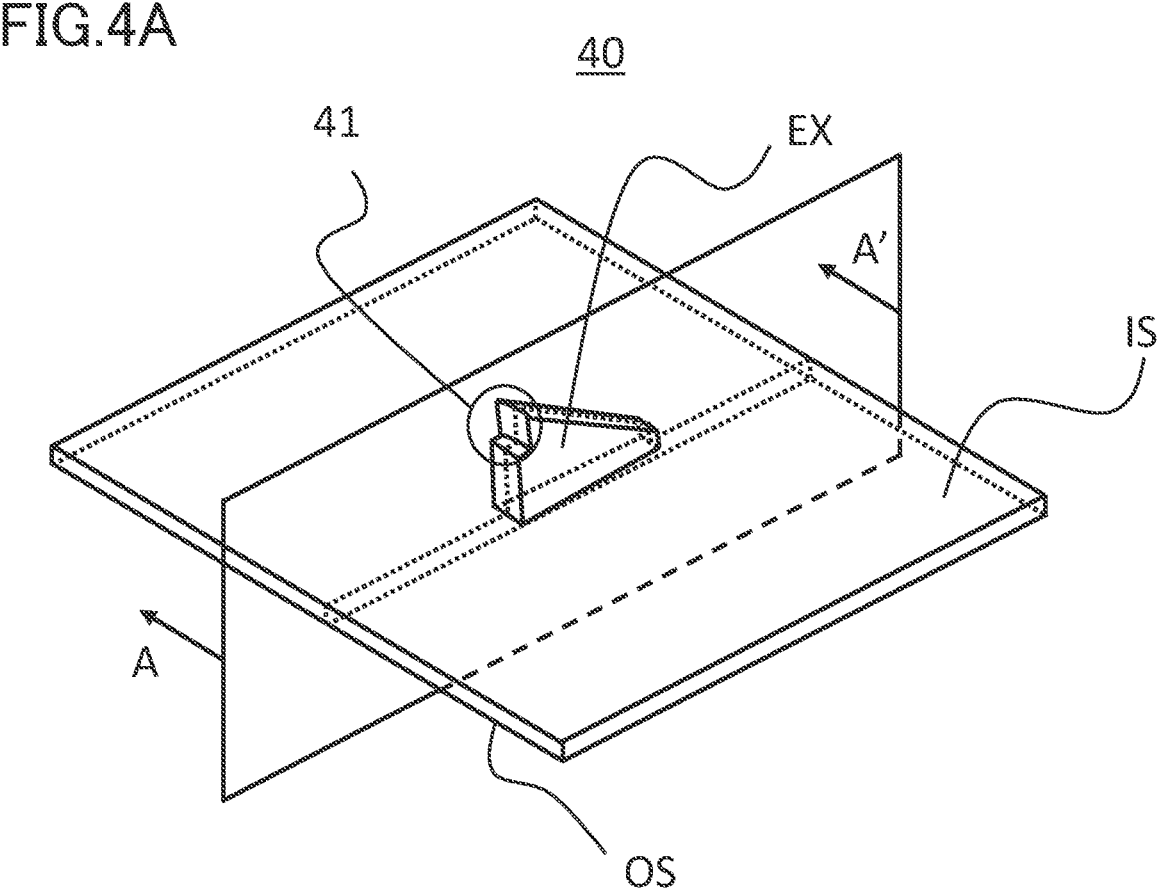
FIG. 4A is a perspective view of a molded resin component 40 of the first embodiment, viewed from a side of the molded resin component 40 opposite to an exterior surface of the molded resin component 40.
Figure 4B:
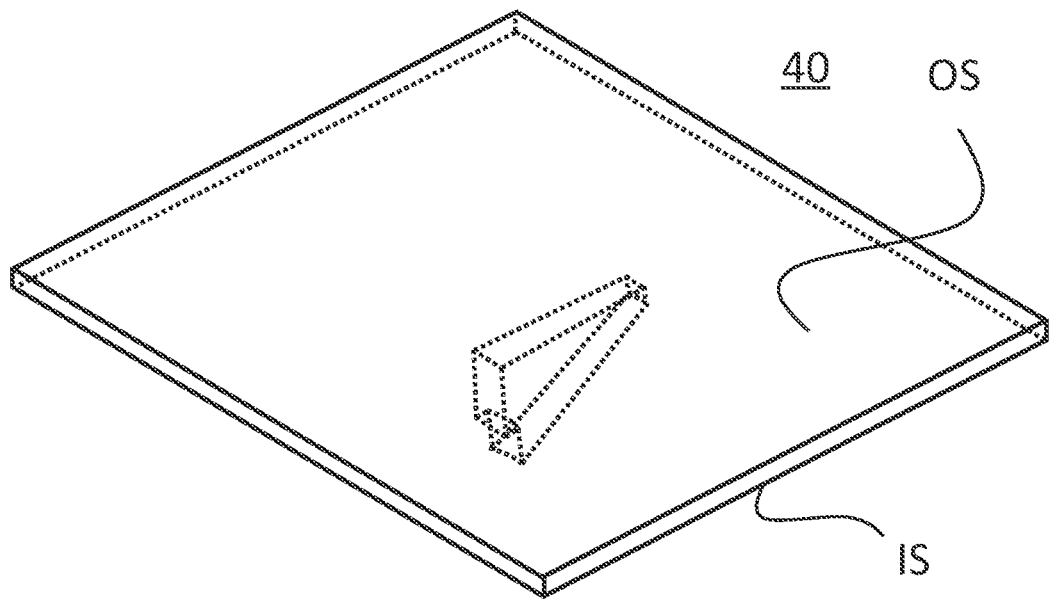
FIG. 4B is a perspective view of the molded resin component 40 of the first embodiment, viewed from the exterior surface side.

FIGS. 4A and 4B illustrate a molded resin component 40 of the present embodiment. FIG. 4A is a perspective view of the molded resin component 40, viewed from a side of the molded resin component 40 opposite to the exterior surface of the molded resin component 40. FIG. 4B is a perspective view of the molded resin component 40, viewed from the exterior surface side. Note that FIGS. 1, 2A, 2B, 3A, and 3B described above are cross-sectional views taken along a line A-A' of FIG. 4A.

The molded resin component 40 of the present embodiment has the exterior surface OS and the non-exterior surface IS. The exterior surface OS is a surface that can be seen by a user after the molded resin component 40 is mounted in a product, and the non-exterior surface IS is a surface that cannot be seen by a user after the molded resin component 40 is mounted in the product. The exterior surface OS is a surface to which the shape of the mold surface OSM of the movable mold 4 was transferred, and is opposite to the non-exterior surface IS to which the shape of the mold surface ISM was transferred. On the non-exterior surface IS, a convex portion EX formed by the cavity portion CAV-EX is formed. On a leading end portion of the convex portion EX, a gate mark 41 is formed.

Figure 5:
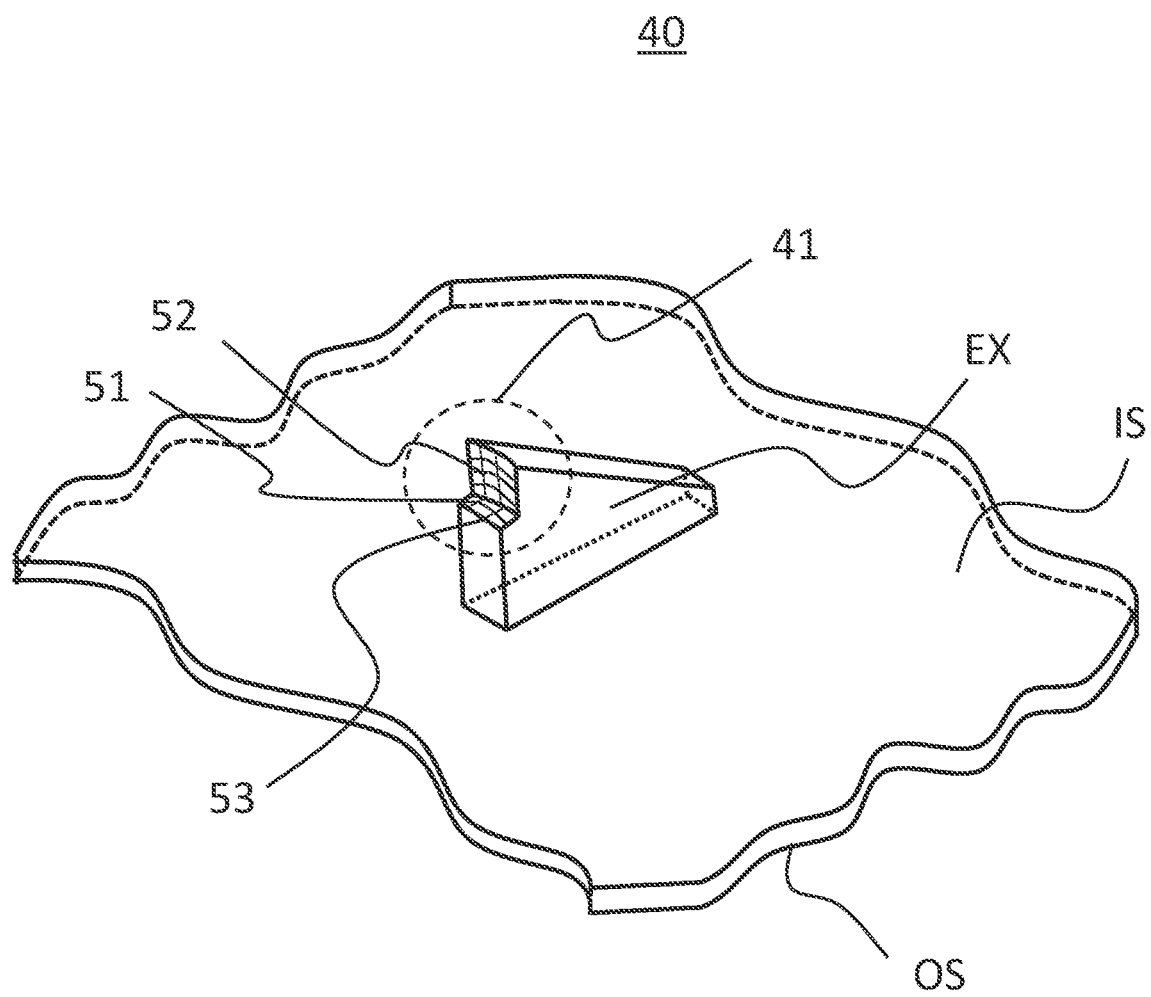
FIG. 5 is an enlarged perspective view of a convex portion EX of the molded resin component 40 and its surroundings of the first embodiment.

FIG. 5 is an enlarged perspective view of the convex portion EX and its surroundings. The gate mark 41 includes a parting line (boundary mark) 53 formed by a boundary (FIG. 3B) between the valve pin 2 and the gate bush 3. In addition, the gate mark 41 includes a first surface 51 and a second surface 52. The first surface 51 is a surface to which a shape of the leading-end surface of the valve pin 2 was transferred, and the second surface 52 is a surface in which a slide mark is left. The slide mark is formed by the side surface of the valve pin 2 sliding on the second surface 52 when the molded resin component 40 is released from the mold. As can be easily understood from FIG. 3B, the shape of a portion of the leading-end surface of the valve pin 2 through which the central axis CX passes is not transferred to the first surface 51. Thus, the molded resin component 40 of the present embodiment includes the convex portion EX in which a molding mark is formed, and the molding mark is formed by a portion of the leading end portion of the valve pin (that opens and closes the gate) that does not include the central axis. In other words, the molded resin component 40 includes the convex portion EX in which a contact mark is formed, and the contact mark is formed when the convex portion EX is in contact with a portion of the leading end portion of the valve pin that does not include the central axis.

In the molded resin component 40 of the present embodiment that includes the convex portion EX having the above-described structure and formed on the non-exterior surface IS opposite to the exterior surface OS, the local area that gives a feeling of gloss (or color) different from that given by an area around the local area is suppressed from being formed in the exterior surface OS. Thus, the exterior surface formed has high quality.

Figure 18A:
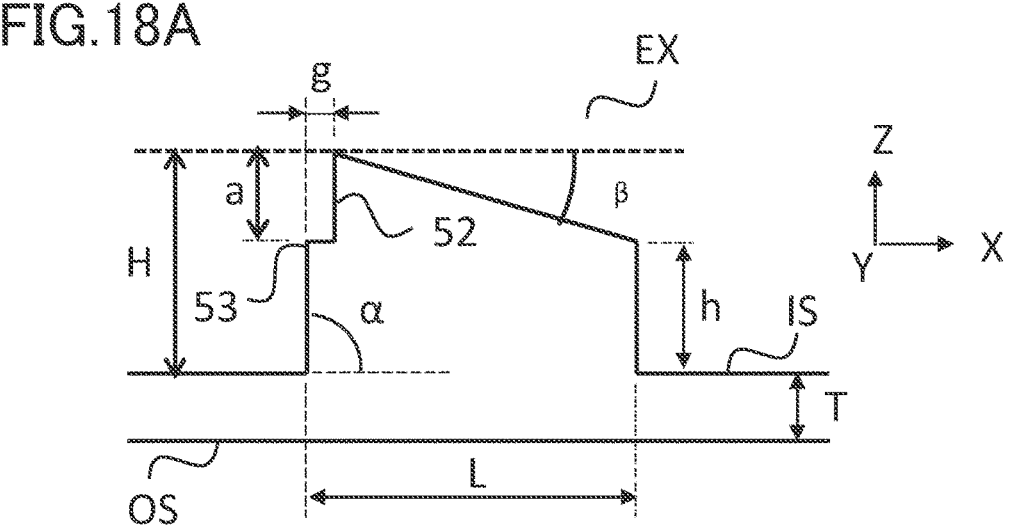
FIG. 18A is a front view in which a main surface of the convex portion EX of the molded resin component of the first embodiment is seen.
Figure 18B:
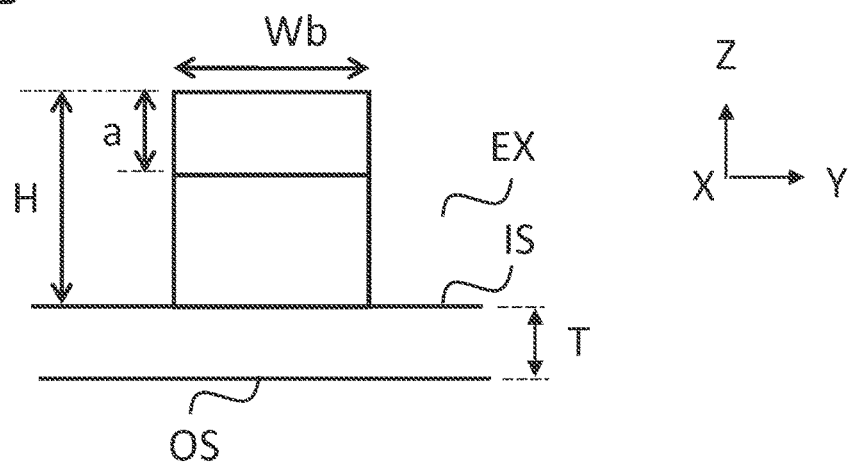
FIG. 18B is a side view of the convex portion EX of the molded resin component of the first embodiment.
Figure 18C:
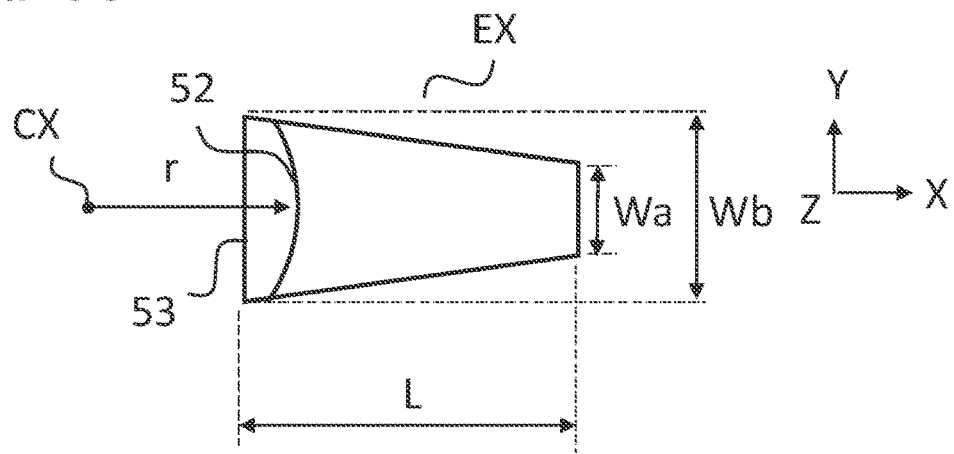
FIG. 18C is a plan view of the convex portion EX of the molded resin component of the first embodiment.

Next, a specific structure of the convex portion EX will be described with reference to FIGS. 18A to 18C. FIG. 18A is a front view in which the main surface of the convex portion EX can be seen, FIG. 18B is a side view, and FIG. 18C is a plan view. For suppressing the local area, which gives a feeling of gloss (or color) different from that given by an area around the local area, from being formed in the exterior surface OS of a molded resin component, the convex portion EX preferably has the following dimensions. L is equal to or larger than 2.5 mm and equal to or smaller than 20 mm; H is equal to or larger than 2 mm and equal to or smaller than 10 mm, h is equal to or larger than 2 mm and equal to or smaller than 10 mm; T is equal to or larger than 0.5 mm and equal to or smaller than 5 mm; Wa and Wb are equal to or larger than 1 mm and equal to or smaller than 5 mm; and a radius r of the valve pin is equal to or larger than 0.5 mm and equal to or smaller than 5 mm. In addition, a distance g between the parting line 53, formed by the boundary (see FIG. 3B) between the valve pin 2 and the gate bush 3, and an edge mark of the valve pin 2 is equal to or larger than 0.5 mm and equal to or smaller than 5 mm. A height a of the second surface 52 in which the slide mark, formed by the side surface of the valve pin 2 sliding on the second surface 52 when the molded resin component 40 is released from the mold, is left is equal to or larger than 1 mm and equal to or smaller than 8 mm. In addition, an angle $\alpha$ is equal to or larger than 45 degrees and equal to or smaller than 90 degrees, and an angle $\beta$ is equal to or larger than 0 degrees and equal to or smaller than 45 degrees. The relationship in magnitude between Wa and Wb, and the relationship in magnitude between H and h can be freely selected within the above-described numerical range. For example, the convex portion EX may be a polyhedron constituted by a plurality of flat surfaces, and in this case, it is desirable to satisfy the expression: $Wb \leq 2 \times Wa$. In the present embodiment, since the shape of a portion of the leading-end surface of the valve pin 2 through which the central axis CX passes is not transferred to the molded resin component, the relationships of $a<H$ and $g<r$ are satisfied. In addition to this, the relationships of $\beta \leq \alpha$, $Wb \leq 2 \times r$, $h \leq H$, $Wa \leq Wb$, $Wb \leq L$, $T \leq H$, and the like may be satisfied. Note that in the above-described expressions, the condition of equality may not be satisfied.

Figure 17:
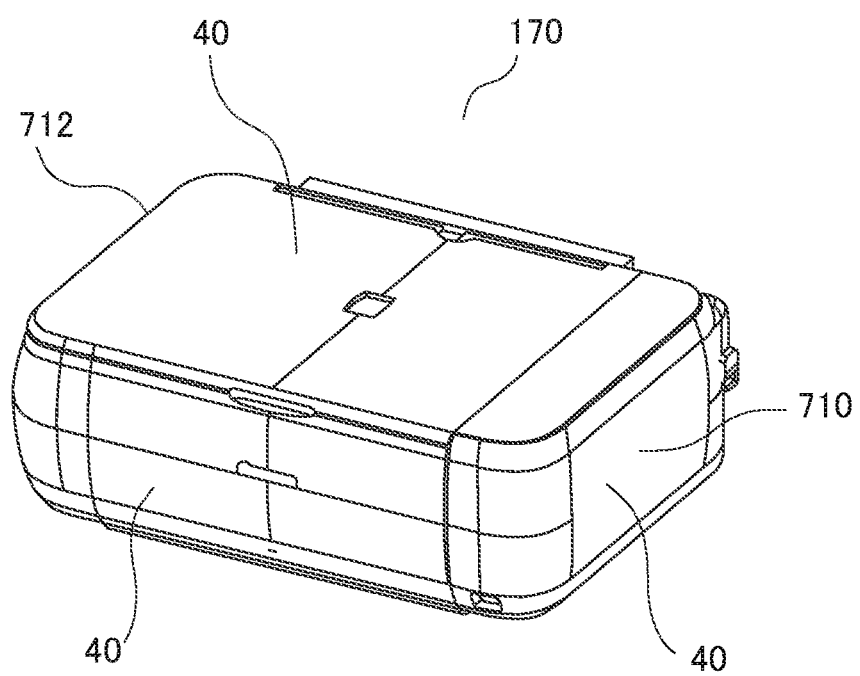
FIG. 17 is a perspective view of a printer in which a molded resin component of an embodiment is used as an exterior component.

FIG. 17 is a perspective view of a printer in which the molded resin component 40 of the present embodiment is used as an exterior component. FIG. 17 illustrates a multi-function printer 170, and a document cover 712 and a housing 710 are made of white or black resin, for example. Since the top surface and the side surfaces of the printer are exterior surfaces that can be seen by a user, the surfaces are required to have no local area that gives the different feeling of gloss (or color). Thus, the molded resin component 40 of the present embodiment can be suitably used as the surfaces.

Second Embodiment

Figure 6:
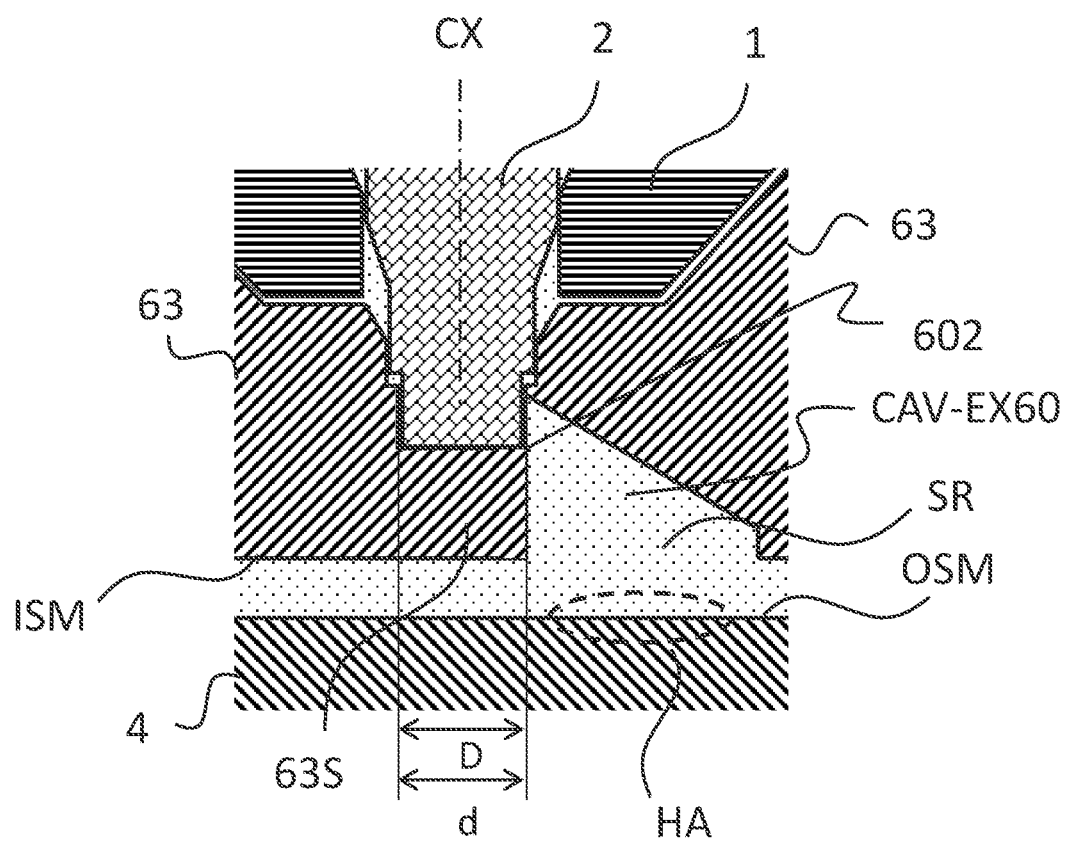
FIG. 6 is a schematic cross-sectional view of an injection molding apparatus of a second embodiment.

FIG. 6 is a schematic cross-sectional view for illustrating an injection molding apparatus of a second embodiment, and corresponds to FIG. 3B described in the first embodiment. In the present embodiment, the description of the same features as those of the first embodiment will be simplified or omitted. Also in the present embodiment, a portion 63S that is a portion of a gate bush 63 is disposed on the extension line of the central axis CX of the valve pin 2. In other words, since the central axis CX of the valve pin 2 is equal to the central axis of the resin nozzle 1, the portion 63S of the gate bush 63 is disposed on the extension line of the central axis of the resin nozzle 1. In the present embodiment, the leading end portion of the valve pin 2 has a rectangular prism shape whose cross-sectional shape is a rectangle in a direction orthogonal to the axis of the valve pin 2. A width D of the leading end of the valve pin 2 and a width d of the portion 63S are set so as to satisfy the equation D=d if errors are not present.

Also in the present embodiment, the melted resin cannot move along the shortest distance from the exit of the resin nozzle 1 to the mold surface OSM. Specifically, the flow direction of the melted resin is changed by the portion 63S, and then the melted resin flows into a cavity portion CAV-EX60. The melted resin flows in a curved flow channel because the melted resin flows through the cavity portion CAV-EX60. While the melted resin flows through the curved flow channel, the heat of the melted resin is drawn by the gate bush 63, so that the temperature of the melted resin decreases from the temperature of the melted resin stored in the resin nozzle 1. That is, the melted resin reaches the mold surface OSM that forms an exterior surface of a molded resin component through transfer, after the temperature of the melted resin decreases. Thus, even in an area HA that is closest to the gate exit, the temperature of the mold surface OSM that forms an exterior surface of a molded resin component through transfer is kept below a glass transition point (Tg) of the resin material.

Figure 7A:
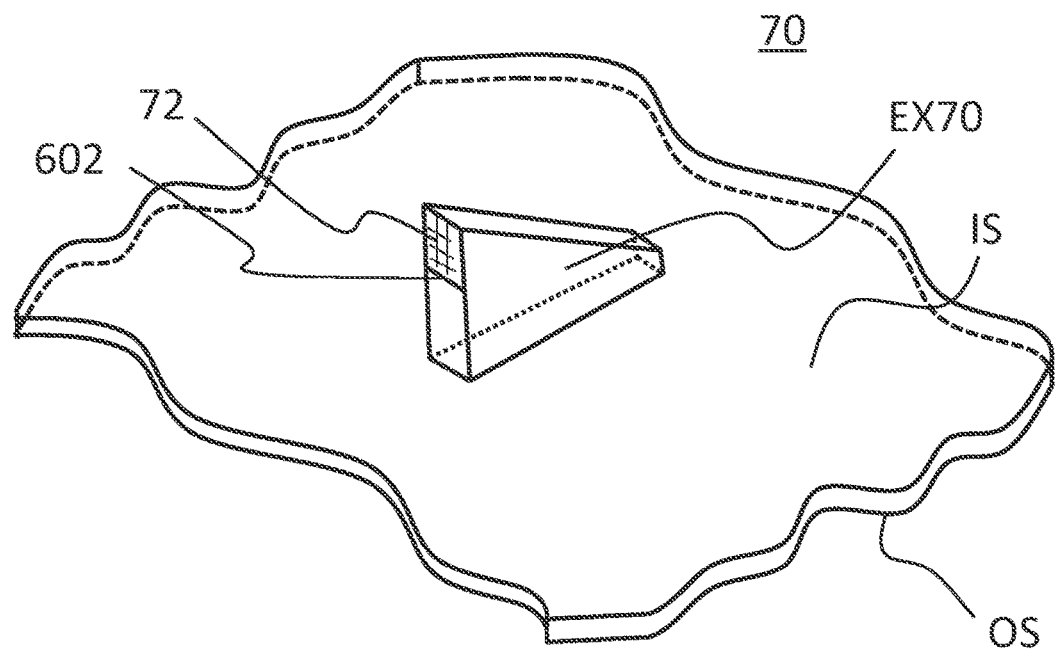
FIG. 7A is a perspective view of a molded resin component 70 of the second embodiment, viewed from a side of the molded resin component 70 opposite to an exterior surface of the molded resin component 70.
Figures 7B, 7C, 7D:
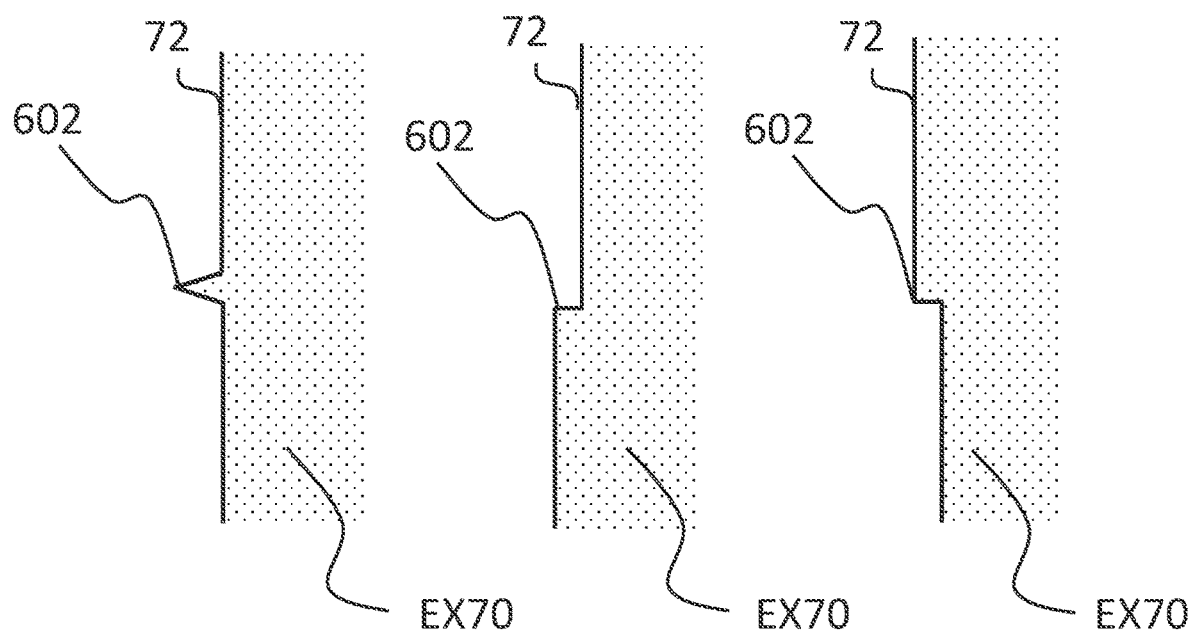
FIG. 7B is a diagram illustrating one example of the cross-sectional shape of a parting line 602.
FIG. 7C is a diagram illustrating another example of the cross-sectional shape of the parting line 602.
FIG. 7D is a diagram illustrating still another example of the cross-sectional shape of the parting line 602.

FIG. 7A illustrates a molded resin component 70 of the present embodiment. FIG. 7A is a perspective view of the molded resin component 70, viewed from a non-exterior surface IS side of the molded resin component 70 opposite to an exterior surface of the molded resin component 70. On the non-exterior surface IS, a convex portion EX70 formed by the cavity portion CAV-EX60 is formed. On a leading end portion of the convex portion EX70, a gate mark is formed. The gate mark includes a parting line 602 formed by a boundary (see FIG. 6) between the valve pin 2 and the gate bush 63, and a surface in which a slide mark 72 is left. The slide mark 72 is formed by the side surface of the valve pin 2 sliding on the surface when the molded resin component 70 is released from the mold. As described above with reference to FIG. 6, the width D of the leading end of the valve pin 2 and the width d of the portion 63S are set so as to satisfy the equation D=d if errors are not present. However, even if the width D is set equal to the width d, the cross section of the parting line 602 may have a shape illustrated in FIG. 7B if a small gap exists between the valve pin 2 and the abutment portion of the portion 63S. In addition, if errors are present in the widths D and d, the cross section of the parting line 602 may have a shape illustrated in FIG. 7C or 7D.

As described above, the molded resin component 70 of the present embodiment includes the convex portion EX70 in which the contact mark is formed. The contact mark is formed when the molded resin component 70 is in contact with the valve pin 2 that opens and closes the gate.

In the molded resin component 70 of the present embodiment that includes the convex portion EX70 having the above-described structure and formed on the non-exterior surface IS opposite to the exterior surface OS, the local area that gives a feeling of gloss (or color) different from that given by an area around the local area is suppressed from being formed in the exterior surface OS. Thus, the exterior surface formed has high quality.

Third Embodiment

Figure 8:
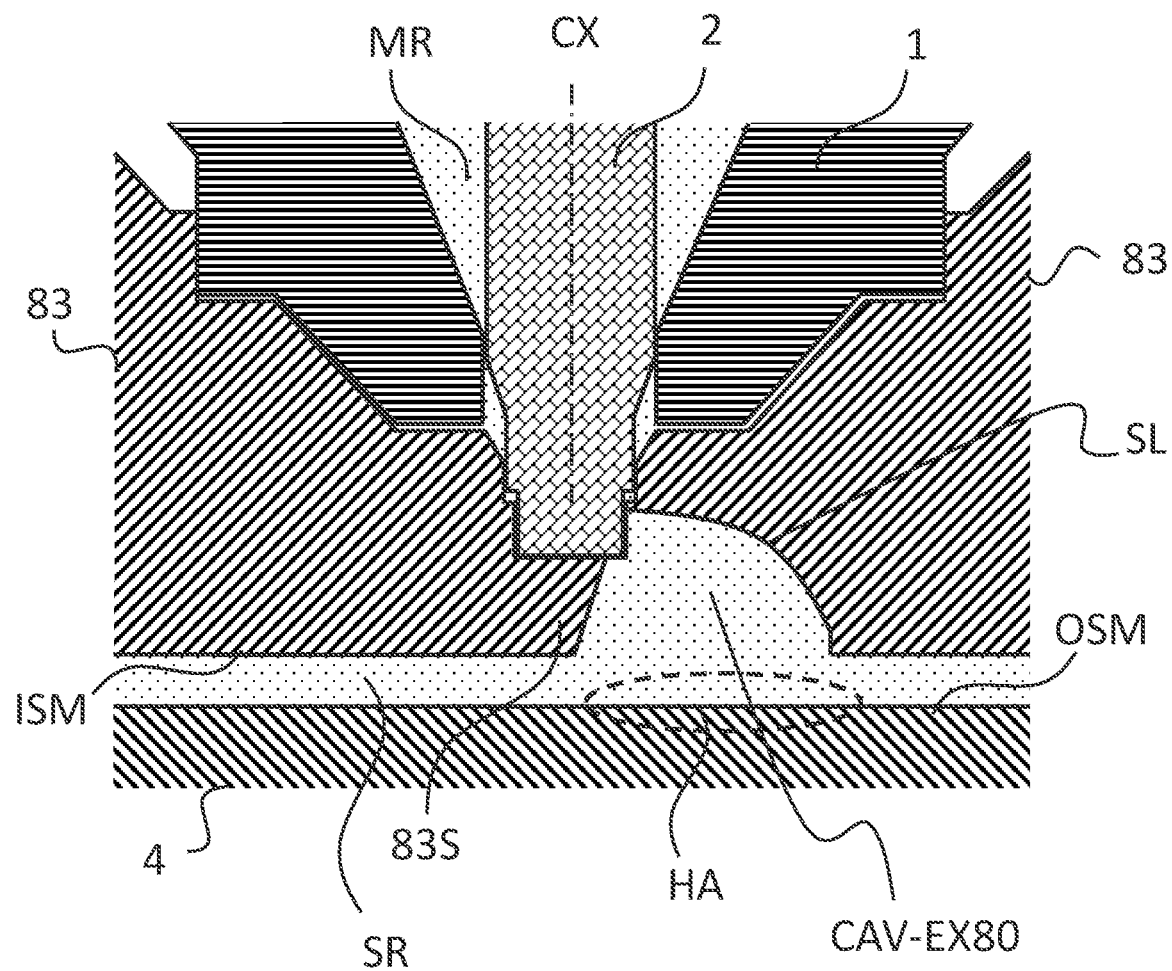
FIG. 8 is a schematic cross-sectional view of an injection molding apparatus of a third embodiment.

FIG. 8 is a schematic cross-sectional view for illustrating an injection molding apparatus of a third embodiment, and corresponds to FIG. 3B described in the first embodiment. In the present embodiment, the description of the same features as those of the first embodiment will be simplified or omitted. Also in the present embodiment, a portion 83S that is a portion of a gate bush 83 is disposed on the extension line of the central axis CX of the valve pin 2. In other words, since the central axis CX of the valve pin 2 is equal to the central axis of the resin nozzle 1, the portion 83S of the gate bush 83 is disposed on the extension line of the central axis of the resin nozzle 1.

Also in the present embodiment, the melted resin cannot move along the shortest distance from the exit of the resin nozzle 1 to the mold surface OSM. Specifically, the flow direction of the melted resin is changed by the portion 83S, and then the melted resin flows into a cavity portion CAV-EX80.

The melted resin flows in a curved flow channel because the melted resin flows through the cavity portion CAV-EX80. While the melted resin flows through the curved flow channel, the heat of the melted resin is drawn by the gate bush 83, so that the temperature of the melted resin decreases from the temperature of the melted resin stored in the resin nozzle 1. In the present embodiment, since the cavity portion CAV-EX80 is defined by a curved surface SL, the melted resin contacts the gate bush 83 in a larger area. Thus, the temperature of the melted resin decreases more before the melted resin reaches the mold surface OSM that forms an exterior surface through transfer. Thus, even in an area HA that is closest to the gate exit, the temperature of the mold surface OSM that forms an exterior surface of a molded resin component through transfer is kept below a glass transition point (Tg) of the resin material. Thus, in the mold surface OSM, the transfer performance of surface shape (fidelity of transfer) does not significantly differ between the area HA, which is closest to the gate exit, and an area around the area HA. Consequently, the flatness (or surface roughness) of the surface of the solidified resin SR hardly differs between the area HA, which is closest to the gate exit, and an area around the area HA.

Also in the present embodiment, a convex portion formed by the cavity portion CAV-EX80 is formed on the non-exterior surface, and a gate mark is formed in a leading end portion of the convex portion. In the molded resin component of the present embodiment that includes the convex portion having the above-described structure and formed on the non-exterior surface IS opposite to the exterior surface OS, the local area that gives a feeling of gloss (or color) different from that given by an area around the local area is suppressed from being formed in the exterior surface OS. Thus, the exterior surface formed has high quality.

Fourth Embodiment

Figure 9A:
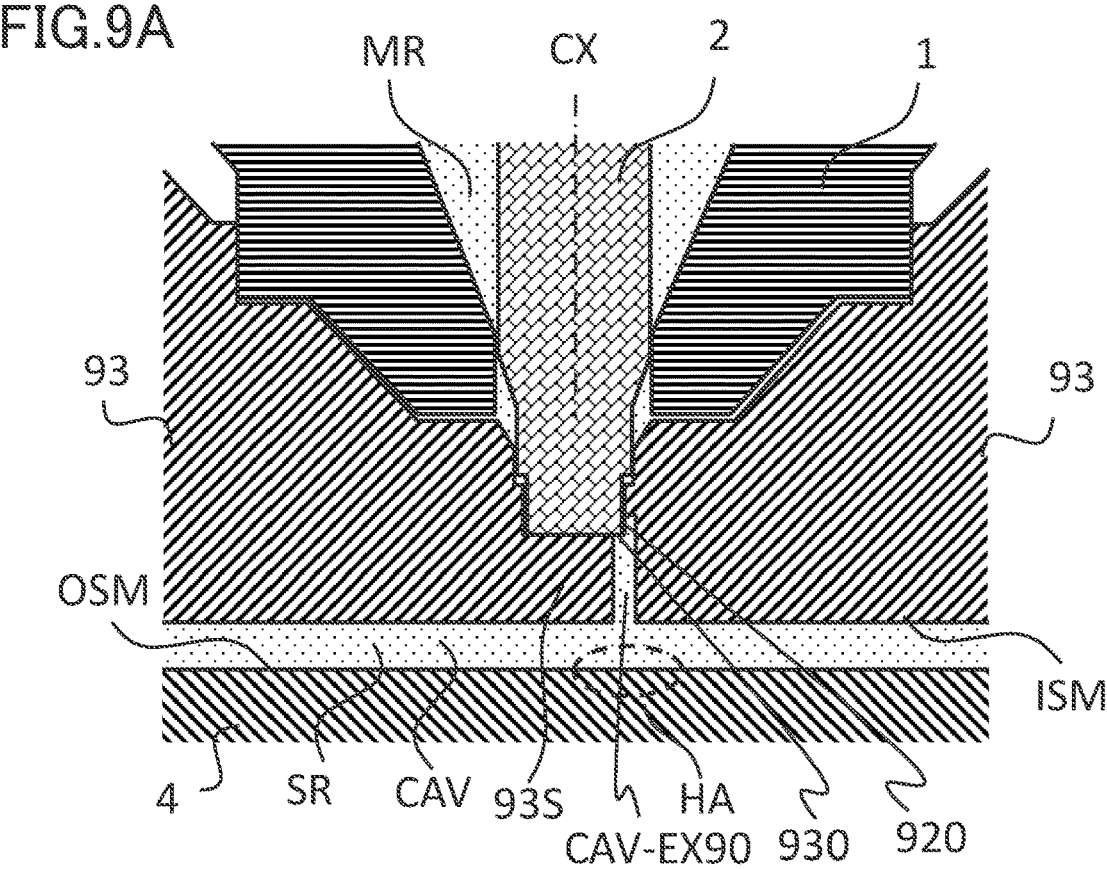
FIG. 9A is a schematic cross-sectional view of an injection molding apparatus of a fourth embodiment.

FIG. 9A is a schematic cross-sectional view for illustrating an injection molding apparatus of a fourth embodiment, and corresponds to FIG. 3B described in the first embodiment. In the present embodiment, the description of the same features as those of the first embodiment will be simplified or omitted. Also in the present embodiment, a portion 93S that is a portion of a gate bush 93 is disposed on the extension line of the central axis CX of the valve pin 2. In other words, since the central axis CX of the valve pin 2 is equal to the central axis of the resin nozzle 1, the portion 93S of the gate bush 93 is disposed on the extension line of the central axis of the resin nozzle 1. In the present embodiment, the leading end portion of the valve pin 2 has a cylindrical shape whose cross-sectional shape is a circle in a direction orthogonal to the axis of the valve pin 2.

Also in the present embodiment, the melted resin cannot move along the shortest distance from the exit of the resin nozzle 1 to the mold surface OSM. Specifically, the flow direction of the melted resin is changed by the portion 93S, and then the melted resin flows into a cavity portion CAV-EX90. In the present embodiment, the cavity portion CAV-EX90 is formed like a rectangular parallelepiped.

The melted resin flows in a curved flow channel because the melted resin flows through the cavity portion CAV-EX90. While the melted resin flows through the curved flow channel, the heat of the melted resin is drawn by the gate bush 93, so that the temperature of the melted resin decreases from the temperature of the melted resin stored in the resin nozzle 1. That is, the melted resin reaches the mold surface OSM that forms an exterior surface of a molded resin component through transfer, after the temperature of the melted resin decreases. Thus, even in an area HA that is closest to the gate exit, the temperature of the mold surface OSM that forms an exterior surface of a molded resin component through transfer is kept below a glass transition point (Tg) of the resin material. Thus, in the mold surface OSM, the transfer performance of surface shape (fidelity of transfer) does not significantly differ between the area HA, which is closest to the gate exit, and an area around the area HA. Consequently, the flatness (or surface roughness) of the surface of the solidified resin SR hardly differs between the area HA, which is closest to the gate exit, and an area around the area HA.

Figure 9B:
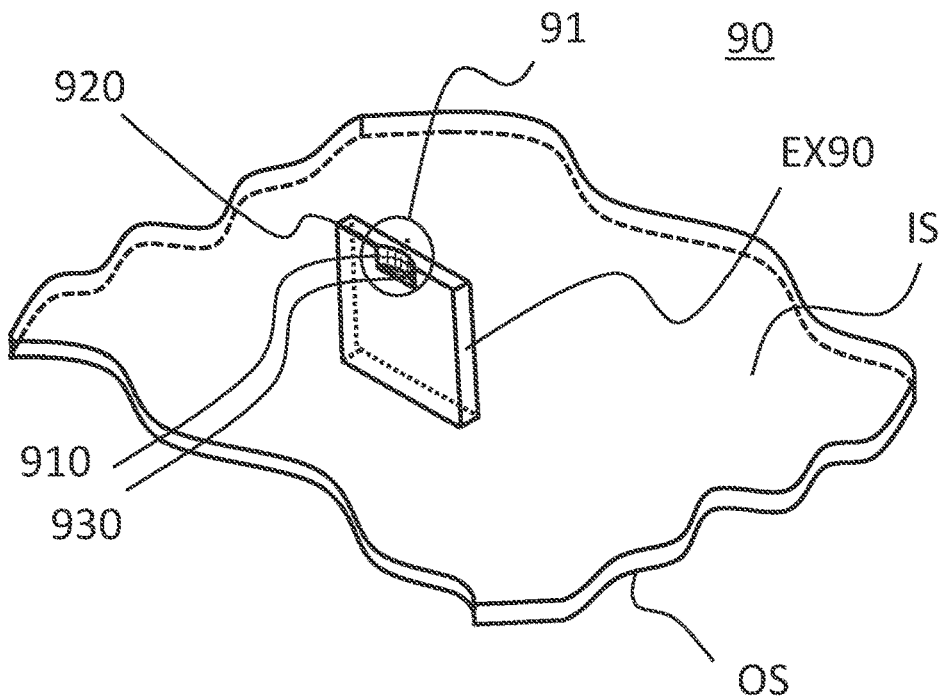
FIG. 9B is a perspective view of a molded resin component 90 of the fourth embodiment, viewed from a side of the molded resin component 90 opposite to an exterior surface of the molded resin component 90.

FIG. 9B illustrates a molded resin component 90 of the present embodiment. FIG. 9B is a perspective view of the molded resin component 90, viewed from a non-exterior surface IS side of the molded resin component 90 opposite to an exterior surface of the molded resin component 90. On the non-exterior surface IS, a rib-shaped convex portion EX90 formed by the cavity portion CAV-EX90 is formed. On a leading end portion of the convex portion EX90, a gate mark 91 is formed. The gate mark 91 includes a parting line 930 formed by a boundary between the valve pin 2 and the gate bush 93, a surface 910 to which the shape of the leading-end surface of the valve pin 2 was transferred, and a surface in which a slide mark 920 is left. The slide mark 920 is formed by the side surface of the valve pin 2 sliding on the surface when the molded resin component 90 is released from the mold. As described above, the molded resin component 90 of the present embodiment includes the convex portion EX90 in which the contact mark is formed. The contact mark is formed when the molded resin component 90 is in contact with the valve pin 2 that opens and closes the gate.

In the molded resin component 90 of the present embodiment that includes the convex portion EX90 having the above-described structure and formed on the non-exterior surface IS opposite to the exterior surface OS, the local area that gives a feeling of gloss (or color) different from that given by an area around the local area is suppressed from being formed in the exterior surface OS. Thus, the exterior surface formed has high quality.

Fifth Embodiment

Figure 10A:
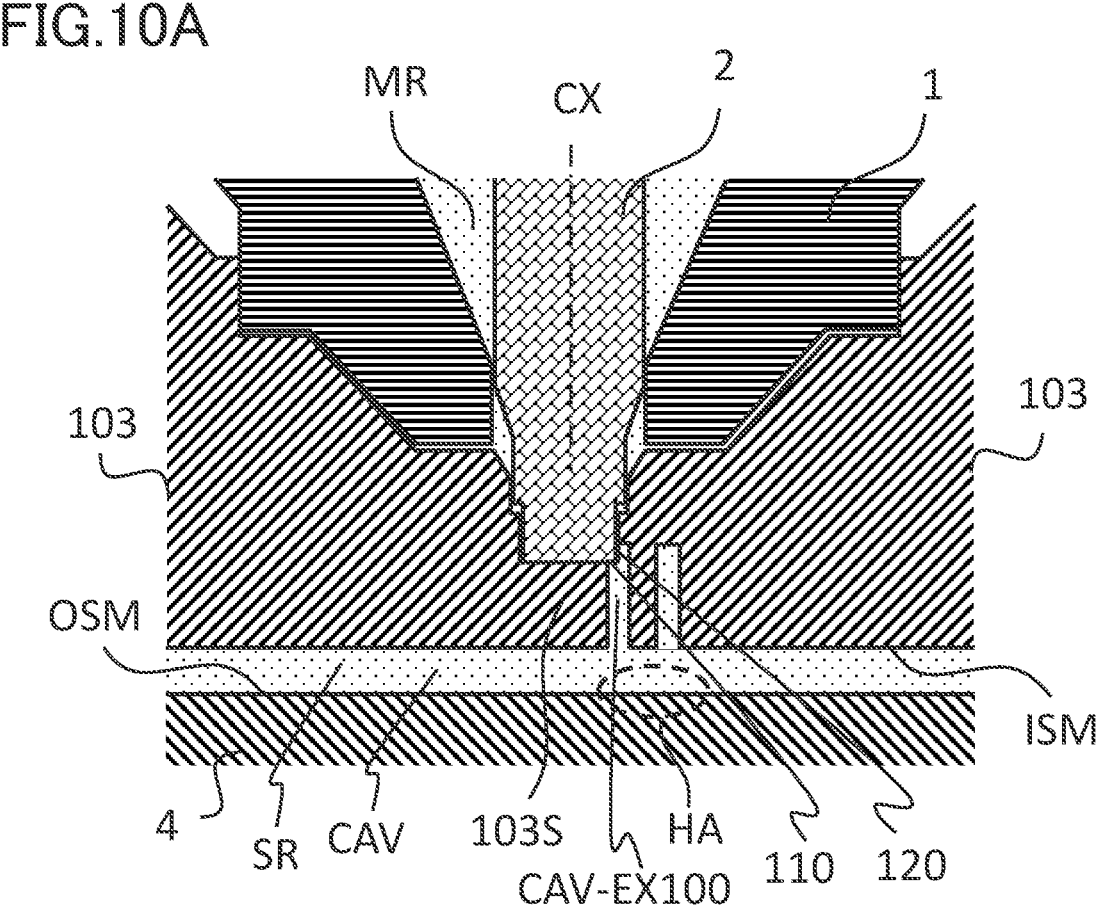
FIG. 10A is a schematic cross-sectional view of an injection molding apparatus of a fifth embodiment.

FIG. 10A is a schematic cross-sectional view for illustrating an injection molding apparatus of a fifth embodiment, and corresponds to FIG. 3B described in the first embodiment. In the present embodiment, the description of the same features as those of the first embodiment will be simplified or omitted. Also in the present embodiment, a portion 103S that is a portion of a gate bush 103 is disposed on the extension line of the central axis CX of the valve pin 2. In other words, since the central axis CX of the valve pin 2 is equal to the central axis of the resin nozzle 1, the portion 103S of the gate bush 103 is disposed on the extension line of the central axis of the resin nozzle 1. In the present embodiment, the leading end portion of the valve pin 2 has a cylindrical shape whose cross-sectional shape is a circle in a direction orthogonal to the axis of the valve pin 2. In the leading end portion of the valve pin 2, a leading-end surface 110 of the valve pin 2 and a side surface 120 of the valve pin 2 face a cavity portion CAV-EX100.

Also in the present embodiment, the melted resin cannot move along the shortest distance from the exit of the resin nozzle 1 to the mold surface OSM. Specifically, the flow direction of the melted resin is changed by the portion 103S, and then the melted resin flows into a cavity portion CAV-EX100. In the present embodiment, the cavity portion CAV-EX100 is formed like a hollow cylinder.

The melted resin flows in a curved flow channel because the melted resin flows through the cavity portion CAV-EX100. While the melted resin flows through the curved flow channel, the heat of the melted resin is drawn by the gate bush 103, so that the temperature of the melted resin decreases from the temperature of the melted resin stored in the resin nozzle 1. That is, the melted resin reaches the mold surface OSM that forms an exterior surface of a molded resin component through transfer, after the temperature of the melted resin decreases. Thus, even in an area HA that is closest to the gate exit, the temperature of the mold surface OSM that forms an exterior surface of a molded resin component through transfer is kept below a glass transition point (Tg) of the resin material. Thus, in the mold surface OSM, the transfer performance of surface shape (fidelity of transfer) does not significantly differ between the area HA, which is closest to the gate exit, and an area around the area HA. Consequently, the flatness (or surface roughness) of the surface of the solidified resin SR hardly differs between the area HA, which is closest to the gate exit, and an area around the area HA.

Figure 10B:
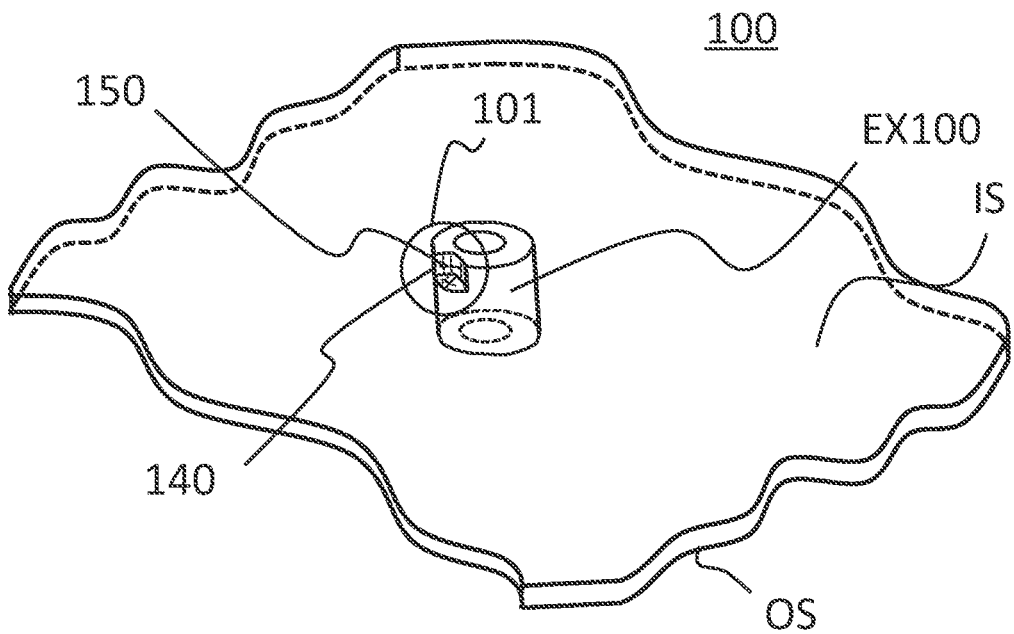
FIG. 10B is a perspective view of a molded resin component 100 of the fifth embodiment, viewed from a side of the molded resin component 100 opposite to an exterior surface of the molded resin component 100.

FIG. 10B illustrates a molded resin component 100 of the present embodiment.

FIG. 10B is a perspective view of the molded resin component 100, viewed from a non-exterior surface IS side of the molded resin component 100 opposite to an exterior surface of the molded resin component 100. On the non-exterior surface IS, a boss-shaped (or hollow-cylinder-shaped) convex portion EX100 formed by the cavity portion CAV-EX100 is formed.

Preferably, the boss-shaped (or hollow-cylinder shaped) convex portion EX100 has an inner diameter equal to or larger than 3 mm and equal to or smaller than 5 mm, and an outer diameter equal to or larger than 6 mm and equal to or smaller than 10 mm. On a leading end portion (i.e., an edge of the hollow cylinder) of the convex portion EX100, a gate mark 101 is formed. The gate mark 101 includes a parting line 140 formed by a boundary between the valve pin 2 and the gate bush 103, and a surface in which a slide mark 150 is left. The slide mark 150 is formed by the side surface 120 of the valve pin 2 sliding on the surface when the molded resin component 100 is released from the mold. The gate mark 101 includes a surface in which a part of the leading-end surface 110 is transferred. As described above, the molded resin component 100 of the present embodiment includes the convex portion EX100 in which the contact mark is formed. The contact mark is formed when the molded resin component 100 is in contact with the valve pin 2 that opens and closes the gate.

In the molded resin component 100 of the present embodiment that includes the convex portion EX100 having the above-described structure and formed on the non-exterior surface IS opposite to the exterior surface OS, the local area that gives a feeling of gloss (or color) different from that given by an area around the local area is suppressed from being formed in the exterior surface OS. Thus, the exterior surface formed has high quality.

Sixth Embodiment

Figure 11A:
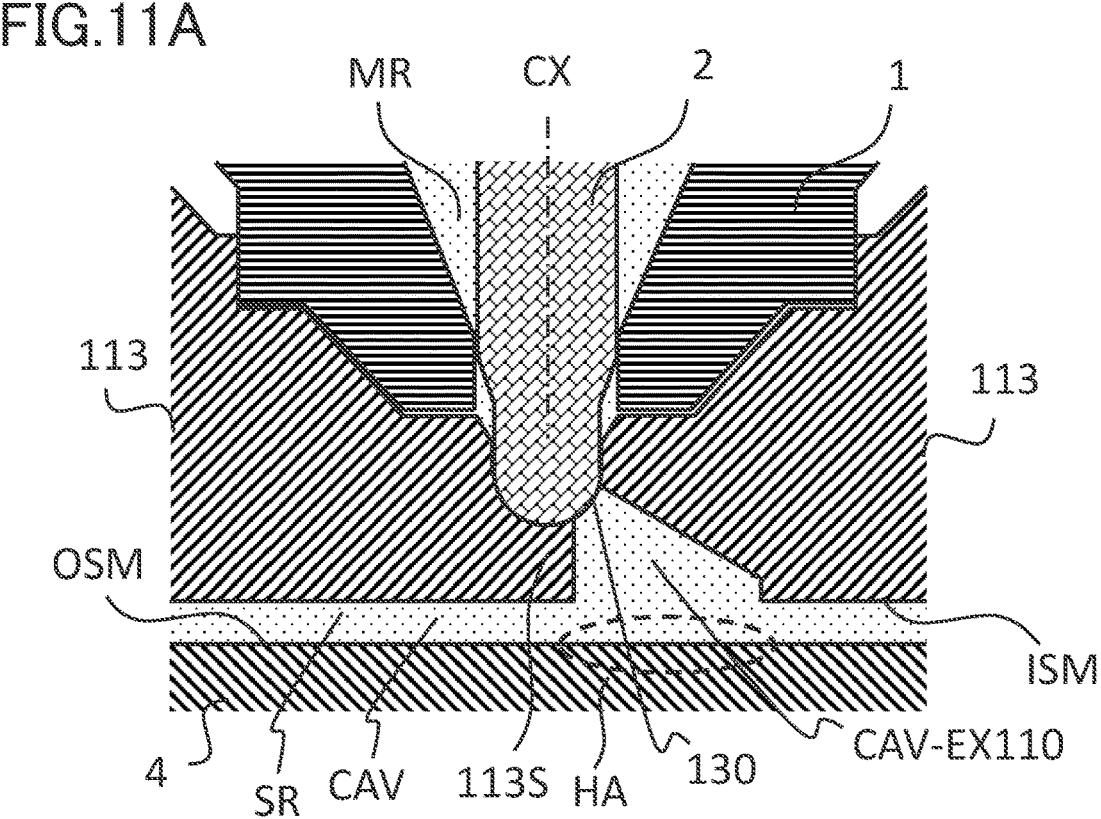
FIG. 11A is a schematic cross-sectional view of an injection molding apparatus of a sixth embodiment.

FIG. 11A is a schematic cross-sectional view for illustrating an injection molding apparatus of a sixth embodiment, and corresponds to FIG. 3B described in the first embodiment. In the present embodiment, the description of the same features as those of the first embodiment will be simplified or omitted. Also in the present embodiment, a portion 113S that is a portion of a gate bush 113 is disposed on the extension line of the central axis CX of the valve pin 2. In other words, since the central axis CX of the valve pin 2 is equal to the central axis of the resin nozzle 1, the portion 113S of the gate bush 113 is disposed on the extension line of the central axis of the resin nozzle 1.

Also in the present embodiment, the melted resin cannot move along the shortest distance from the exit of the resin nozzle 1 to the mold surface OSM. Specifically, the flow direction of the melted resin is changed by the portion 113S, and then the melted resin flows into a cavity portion CAV-EX110. In the present embodiment, the surface of the leading end of the valve pin 2 is not a flat surface but a curved surface. When the leading end of the valve pin 2 abuts against a curved surface of a concave portion of the portion 113S, the gate is closed. In addition, a surface (leading-end surface) of the cavity portion CAV-EX110 defined by the leading end portion of the valve pin 2 is curved. The outermost end of the valve pin 2 may be a point.

The melted resin flows in a curved flow channel because the melted resin flows through the cavity portion CAV-EX110. While the melted resin flows through the curved flow channel, the heat of the melted resin is drawn by the gate bush 113, so that the temperature of the melted resin decreases from the temperature of the melted resin stored in the resin nozzle 1. That is, the melted resin reaches the mold surface OSM that forms an exterior surface of a molded resin component through transfer, after the temperature of the melted resin decreases. Thus, even in an area HA that is closest to the gate exit, the temperature of the mold surface OSM that forms an exterior surface of a molded resin component through transfer is kept below a glass transition point (Tg) of the resin material. Thus, in the mold surface OSM, the transfer performance of surface shape (fidelity of transfer) does not significantly differ between the area HA, which is closest to the gate exit, and an area around the area HA. Consequently, the flatness (or surface roughness) of the surface of the solidified resin SR hardly differs between the area HA, which is closest to the gate exit, and an area around the area HA.

Figure 11B:
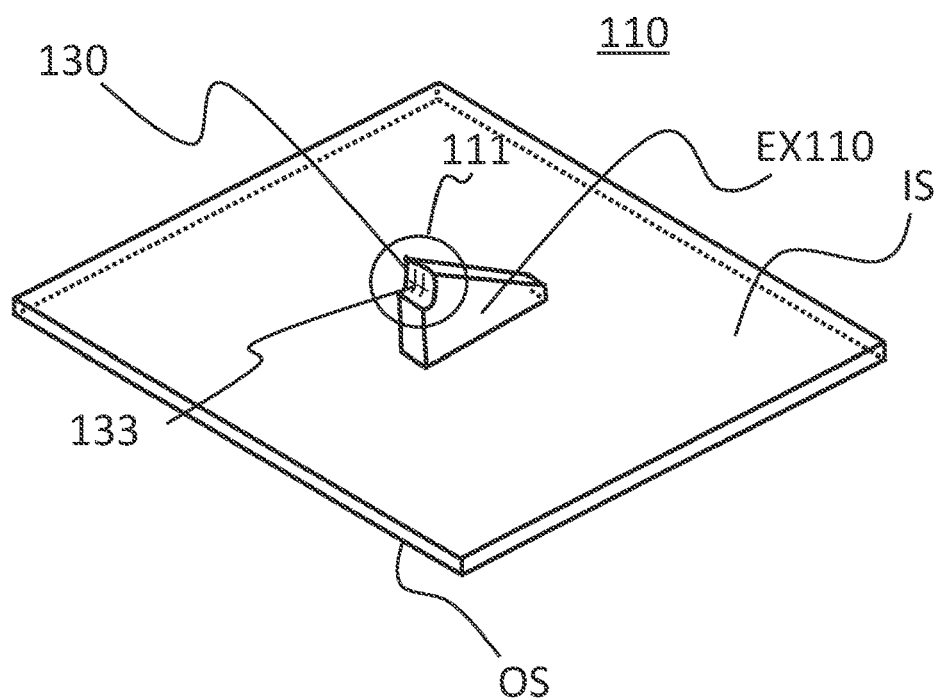
FIG. 11B is a perspective view of a molded resin component 110 of the sixth embodiment, viewed from a side of the molded resin component 110 opposite to an exterior surface of the molded resin component 110.

FIG. 11B illustrates a molded resin component 110 of the present embodiment.

FIG. 11B is a perspective view of the molded resin component 110, viewed from a non-exterior surface IS side of the molded resin component 110 opposite to an exterior surface of the molded resin component 110. On the non-exterior surface IS, a convex portion EX110 formed by the cavity portion CAV-EX110 is formed. On a leading end portion of the convex portion EX110, a gate mark 111 is formed. The gate mark 111 includes a parting line 133 formed by a boundary between the valve pin 2 and the gate bush 113, and a surface 130 to which the shape of the curved surface of the valve pin 2 was transferred. As described above, the molded resin component 110 of the present embodiment includes the convex portion EX110 in which the contact mark is formed. The contact mark is formed when the molded resin component 110 is in contact with the valve pin 2 that opens and closes the gate.

In the molded resin component 110 of the present embodiment that includes the convex portion EX110 having the above-described structure and formed on the non-exterior surface IS opposite to the exterior surface OS, the local area that gives a feeling of gloss (or color) different from that given by an area around the local area is suppressed from being formed in the exterior surface OS. Thus, the exterior surface formed has high quality.

Seventh Embodiment

Figure 12:
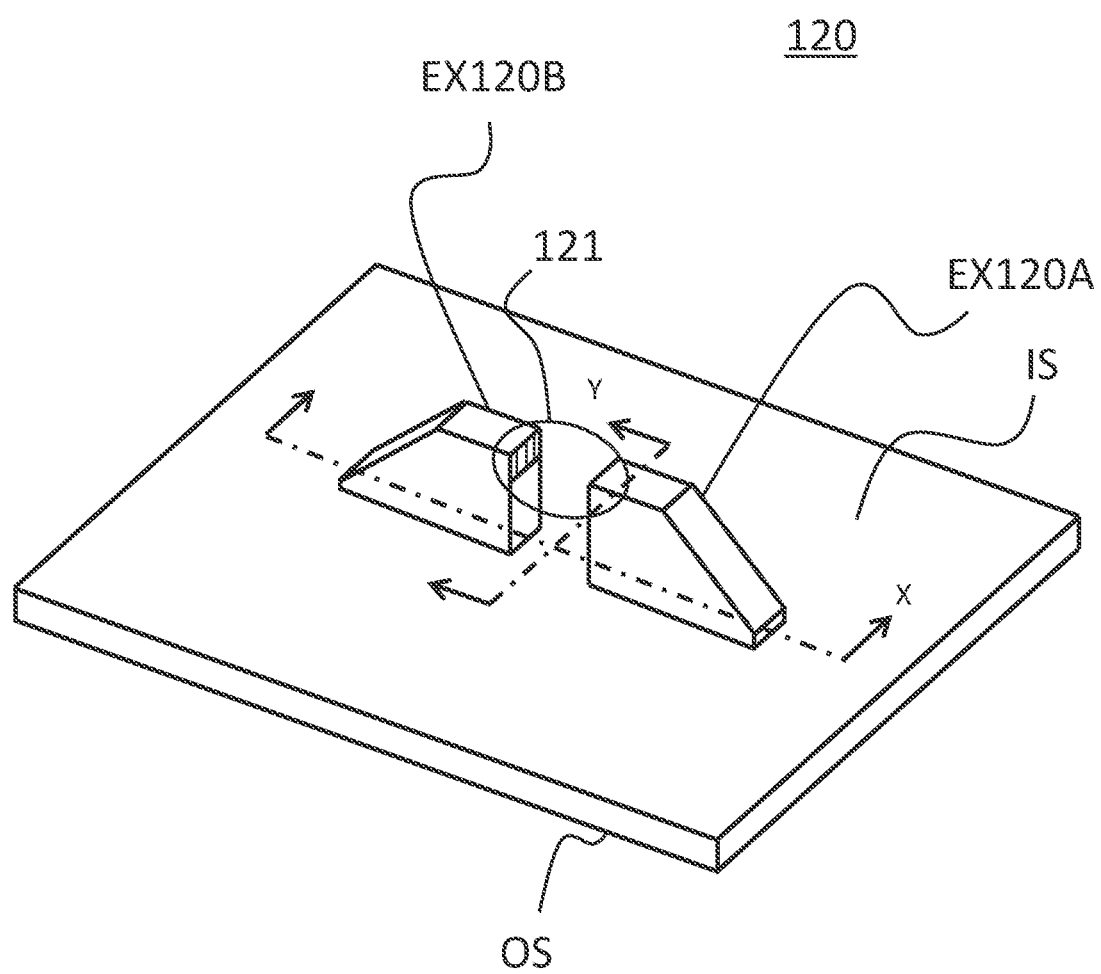
FIG. 12 is a perspective view of a molded resin component 120 of a seventh embodiment, viewed from a side of the molded resin component 120 opposite to an exterior surface of the molded resin component 120.
Figure 13A:
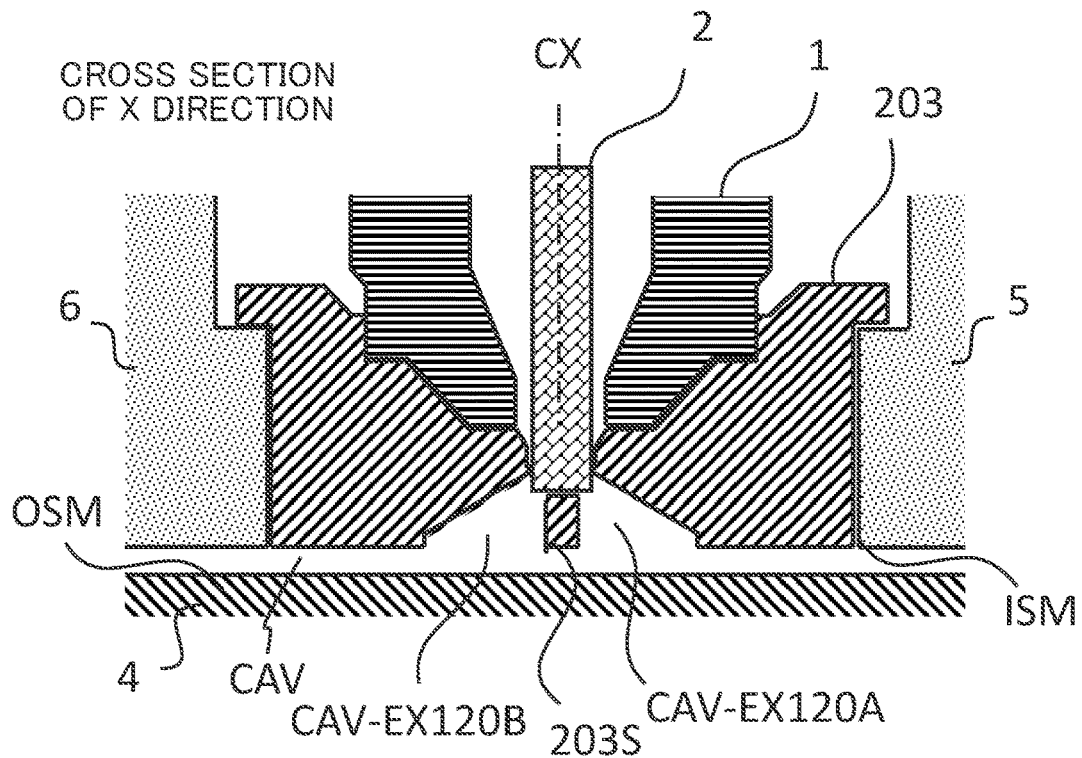
FIG. 13A is a schematic cross-sectional view of an injection molding apparatus of the seventh embodiment, obtained in an X direction in a state where a gate valve is closed.
Figure 13B:
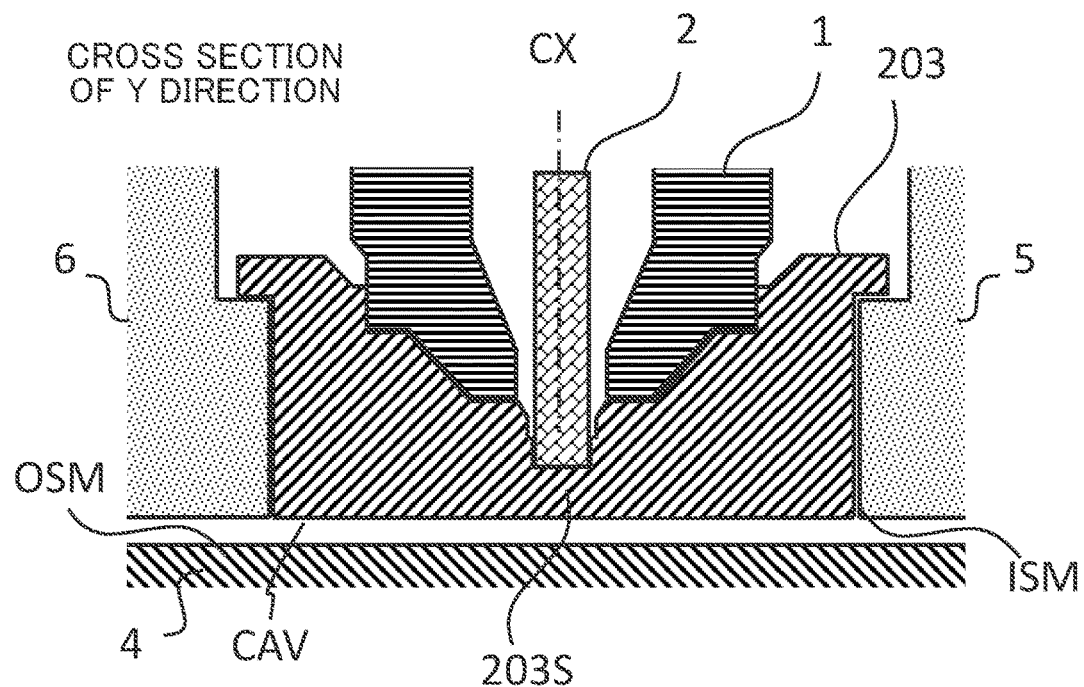
FIG. 13B is a schematic cross-sectional view of the injection molding apparatus of the seventh embodiment, obtained in a Y direction in a state where the gate valve is closed.
Figure 14A:
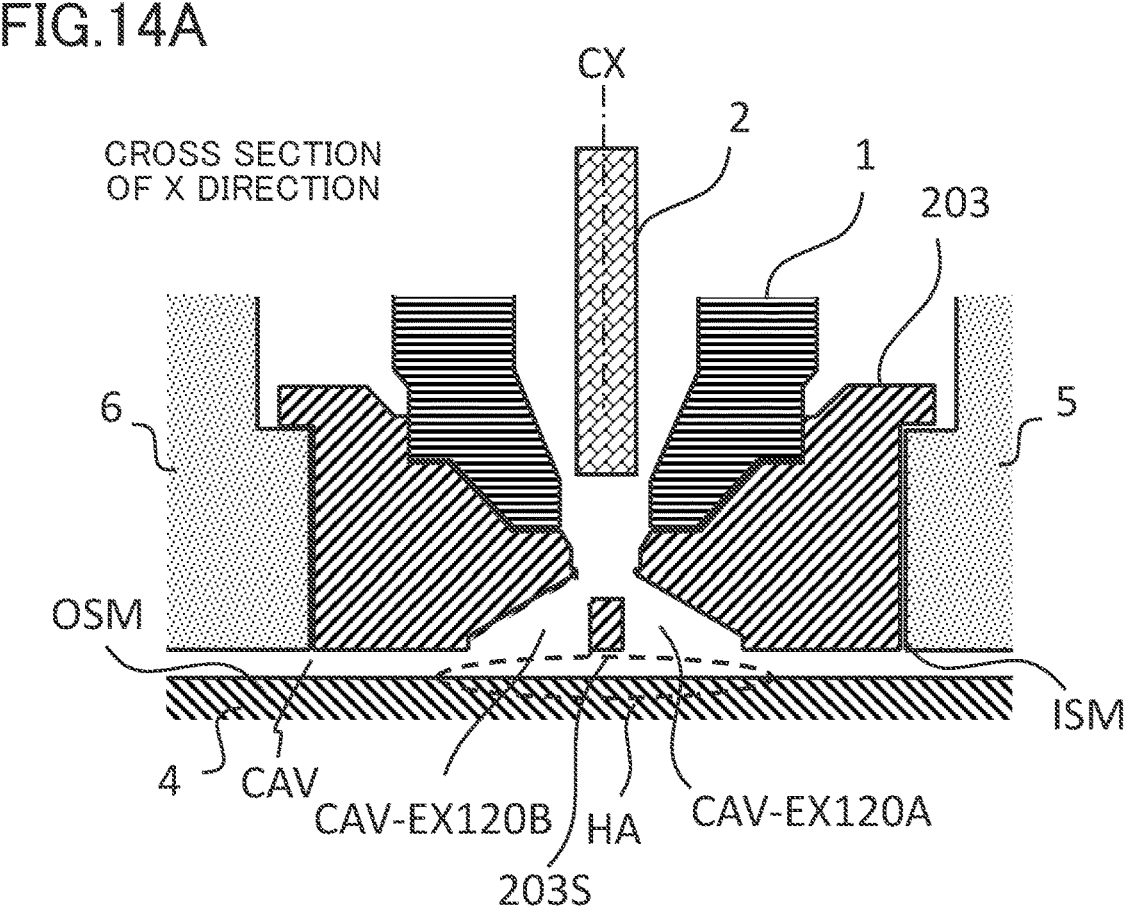
FIG. 14A is a schematic cross-sectional view of the injection molding apparatus of the seventh embodiment, obtained in the X direction in a state where the gate valve is opened.
Figure 14B:
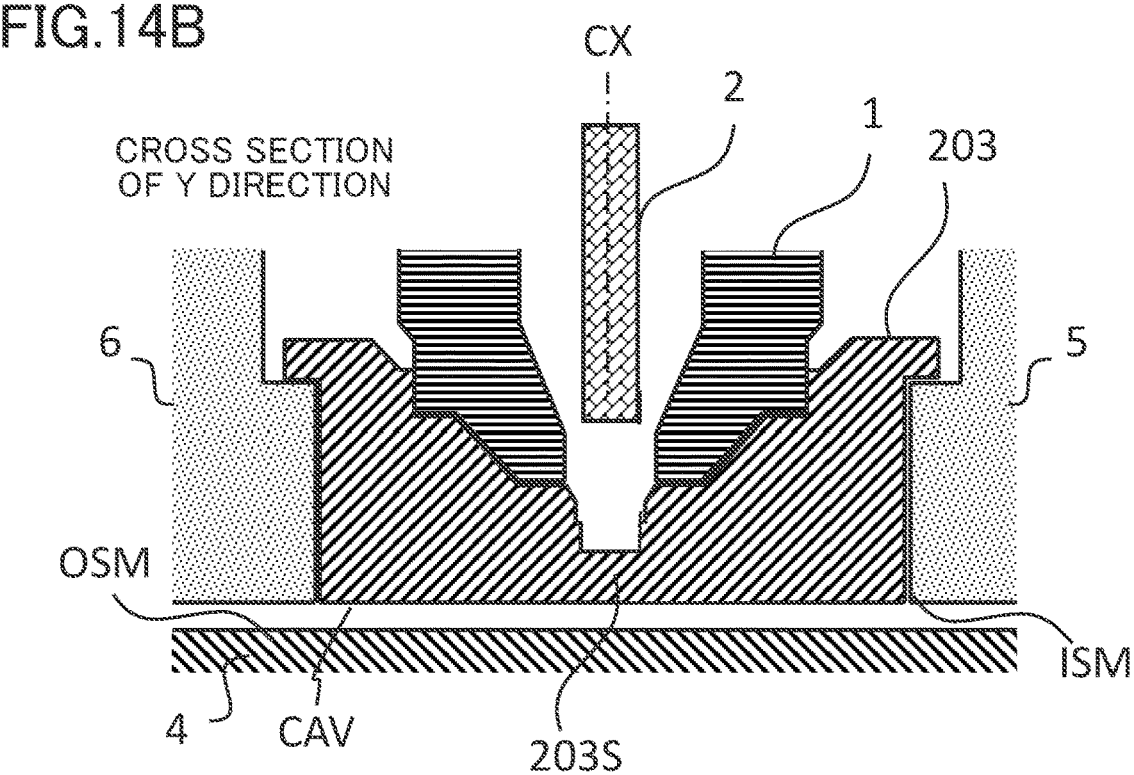
FIG. 14B is a schematic cross-sectional view of the injection molding apparatus of the seventh embodiment, obtained in the Y direction in a state where the gate valve is opened.

FIG. 12 illustrates a molded resin component 120 of a seventh embodiment. FIG. 12 is a perspective view of the molded resin component 120, viewed from a non-exterior surface IS side of the molded resin component 120 opposite to an exterior surface of the molded resin component 120. FIGS. 13A and 13B are schematic cross-sectional views of an injection molding apparatus of the seventh embodiment, and illustrate a state where the gate valve is closed. FIG. 13A illustrates a cross section of the injection molding apparatus taken along an X direction illustrated in FIG. 12, and FIG. 13B illustrates a cross section of the injection molding apparatus taken along a Y direction illustrated in FIG. 12. FIGS. 14A and 14B are schematic cross-sectional views of the injection molding apparatus of the seventh embodiment, and illustrate a state where the gate valve is opened. FIG. 14A illustrates a cross section of the injection molding apparatus taken along the X direction illustrated in FIG. 12, and FIG. 14B illustrates a cross section of the injection molding apparatus taken along the Y direction illustrated in FIG. 12. In the present embodiment, the description of the same features as those of the first embodiment will be simplified or omitted.

Also in the present embodiment, a portion 203S that is a portion of a gate bush 203 is disposed on the extension line of the central axis CX of the valve pin 2. In other words, since the central axis CX of the valve pin 2 is equal to the central axis of the resin nozzle 1, the portion 203S of the gate bush 203 is disposed on the extension line of the central axis of the resin nozzle 1. In the present embodiment, the leading end portion of the valve pin 2 has a rectangular prism shape whose cross-sectional shape is a rectangle in a direction orthogonal to the axis of the valve pin 2.

Also in the present embodiment, the melted resin cannot move along the shortest distance from the exit of the resin nozzle 1 to the mold surface OSM, and the flow direction of the melted resin is changed by the portion 203S. Specifically, the melted resin splits into a cavity portion CAV-EX120A and a cavity portion CAV-EX120B. Preferably, the cavity portion CAV-EX120A and the cavity portion CAV-EX120B are disposed symmetrically with respect to the central axis CX of the valve pin 2.

The melted resin flows in a curved flow channel because the melted resin flows through the cavity portion CAV-EX120A and the cavity portion CAV-EX120B. While the melted resin flows through the curved flow channel, the heat of the melted resin is drawn by the gate bush 203, so that the temperature of the melted resin decreases from the temperature of the melted resin stored in the resin nozzle 1. That is, the melted resin reaches the mold surface OSM that forms an exterior surface of a molded resin component through transfer, after the temperature of the melted resin decreases. Thus, even in an area HA that is closest to the gate exit, the temperature of the mold surface OSM that forms an exterior surface of a molded resin component through transfer is kept below a glass transition point (Tg) of the resin material. Thus, in the mold surface OSM, the transfer performance of surface shape (fidelity of transfer) does not significantly differ between the area HA, which is closest to the gate exit, and an area around the area HA. Consequently, the flatness (or surface roughness) of the surface of the solidified resin SR hardly differs between the area HA, which is closest to the gate exit, and an area around the area HA.

As illustrated in FIG. 12, on the non-exterior surface IS of the molded resin component 120, a convex portion EX120A formed by the cavity portion CAV-EX120A and a convex portion EX120B formed by the cavity portion CAV-EX120B are formed.

On a leading end portion of each of the convex portion EX120A and the convex portion EX120B, a gate mark 121 is formed. The gate mark 121 includes a parting line formed by a boundary between the valve pin 2 and the gate bush 203, a surface to which the shape of the leading-end surface of the valve pin 2 was transferred, and a surface in which a slide mark is left. The slide mark is formed by the side surface of the valve pin 2 sliding on the surface when the molded resin component 120 is released from the mold. As described above, the molded resin component 120 of the present embodiment includes the convex portion EX120A and the convex portion EX120B in each of which the contact mark is formed. The contact mark is formed when the molded resin component 120 is in contact with the valve pin 2 that opens and closes the gate.

In the molded resin component 120 of the present embodiment that includes the convex portion EX120A and the convex portion EX120B each having the above-described structure and formed on the non-exterior surface IS opposite to the exterior surface OS, the local area that gives a feeling of gloss (or color) different from that given by an area around the local area is suppressed from being formed in the exterior surface OS. Thus, the exterior surface of the molded resin component 120 of the present embodiment has high quality.

EXAMPLES

Hereinafter, specific examples and a comparative example will be described. In the examples and the comparative example, resin components whose exterior surfaces had an identical outer shape were molded by using an injection molding method. In addition, the resin components were molded by using injection molding apparatuses having an identical basic configuration. However, in each of the examples and the comparative example, a corresponding valve pin and gate bush were attached to the injection molding apparatus.

The examples and the comparative example have the following common conditions. The resin material used was a polystyrene (PS) having a glass transition point temperature (Tg) of 90° C. The resin components were molded for the exterior of the multifunction printer illustrated in FIG. 17. Each of the molded resin components is a plate-like member having a thickness equal to or larger than 0.5 mm and equal to or smaller than 5 mm, and was molded by injecting the resin material from a position on the non-exterior surface side. The position is opposite to a substantially central position located in a plan view of the exterior surface. In other words, the gate mark was formed on the non-exterior surface at a position opposite to a substantially central position located in a plan view of the exterior surface of the molded resin component.

The conditions of molding are as follows. The temperature of the hot runner of the injection molding apparatus was set at 230° C., and the temperature of the melted resin stored in the hot runner was adjusted at 230° C. The setting temperature of a temperature adjustment mechanism of the mold was set at 60° C., the filling time of resin into the cavity was set at 2 seconds, and the cooling time after the gate is closed was set at 10 seconds. In addition, the injection rate (volumetric flow rate) of the melted resin injected from the hot runner into the cavity was set at a value in a range from 20 to 450 cm$^3$/sec, as an example.

Example 1

The first embodiment was embodied under the above-described conditions of molding. Note that the width D of the leading-end surface of the valve pin in the direction orthogonal to the central axis of the valve pin and the width d of the portion 3S of the gate bush 3 were set so as to satisfy the equation d/D=0.75. In the molded resin component of the present example, the local area that gives a feeling of gloss (or color) different from that given by an area around the local area was suppressed from being formed in the exterior surface OS. Thus, the exterior surface formed had high quality.

Example 2

The second embodiment was embodied under the above-described conditions of molding. Note that the width D of the leading-end surface of the valve pin in the direction orthogonal to the central axis of the valve pin and the width d of the portion 63S of the gate bush 63 were set so as to satisfy the equation d/D=1.0. In the molded resin component of the present example, the local area that gives a feeling of gloss (or color) different from that given by an area around the local area was suppressed from being formed in the exterior surface OS. Thus, the exterior surface formed had high quality.

Example 3

The third embodiment was embodied under the above-described conditions of molding. Note that the width D of the leading-end surface of the valve pin in the direction orthogonal to the central axis of the valve pin and the width d of the portion 83S of the gate bush 83 were set so as to satisfy the equation d/D=0.75. In the molded resin component of the present example, the local area that gives a feeling of gloss (or color) different from that given by an area around the local area was suppressed from being formed in the exterior surface OS. Thus, the exterior surface formed had high quality.

Example 4

The fourth embodiment was embodied under the above-described conditions of molding. Note that the width D of the leading-end surface of the valve pin in the direction orthogonal to the central axis of the valve pin and the width d of the portion 93S of the gate bush 93 were set so as to satisfy the equation d/D=0.9. In the molded resin component of the present example, the local area that gives a feeling of gloss (or color) different from that given by an area around the local area was suppressed from being formed in the exterior surface OS. Thus, the exterior surface formed had high quality.

Comparative Example

Figure 15A:
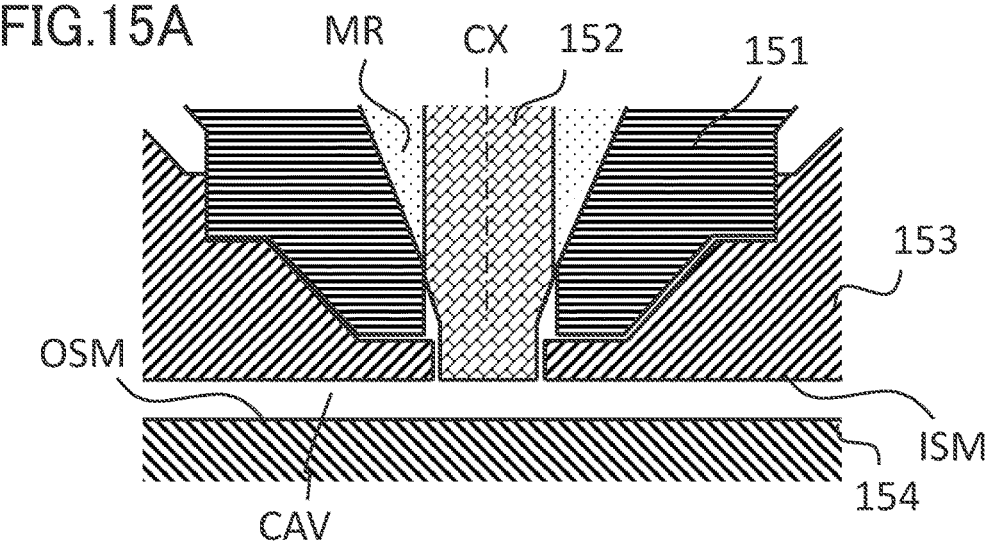
FIG. 15A is a schematic cross-sectional view of an injection molding apparatus of a comparative example, illustrating a state where a gate valve is closed.
Figure 15B:
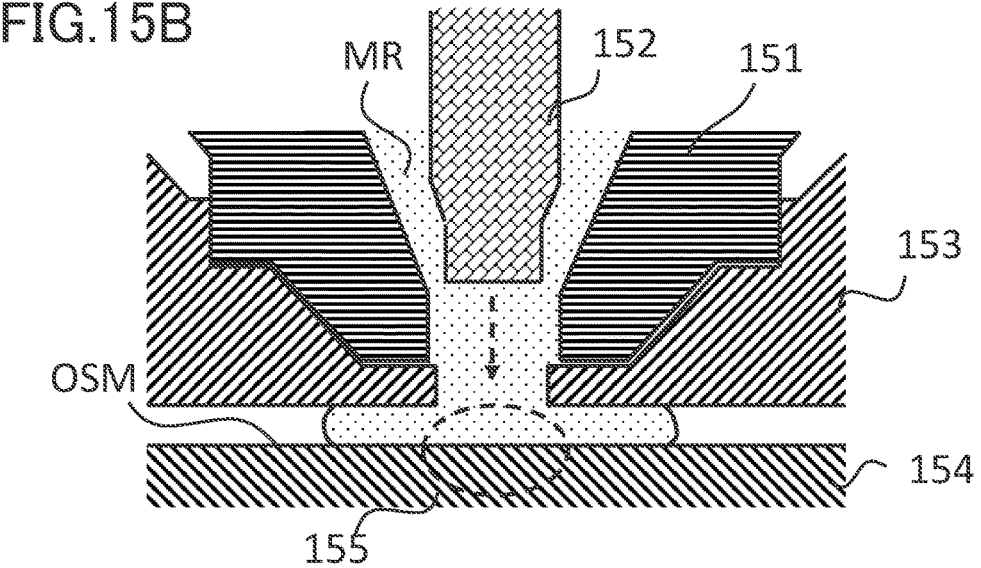
FIG. 15B is a schematic cross-sectional view of the injection molding apparatus of the comparative example, illustrating a state where the gate valve is opened.
Figure 15C:
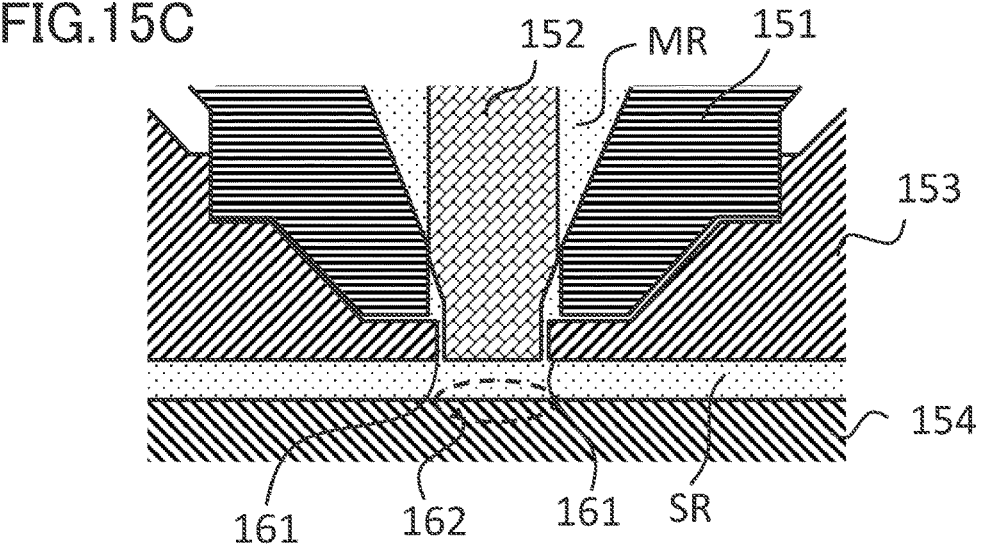
FIG. 15C is a diagram illustrating a stage where the filling of resin into the cavity CAV is completed and the resin is solidified in the comparative example.

FIGS. 15A to 15C are schematic cross-sectional views for illustrating an injection molding apparatus of Comparative Example. FIG. 15A illustrates a state (gate-closed state) in which the flow channel of the melted resin MR extending from a resin nozzle 151 to the cavity CAV is closed by a valve pin 152 moving downward before the injection molding is started. In the injection molding apparatus of Comparative Example, the leading-end surface of a valve pin 152 including a portion through which the central axis CX passes is exposed to the cavity CAV. That is, in Comparative Example, a gate bush 153 is not disposed on the extension line of the central axis CX of the valve pin 152.

In Comparative Example, when the flow channel extending from the resin nozzle 151 to the cavity is opened by the valve pin 152 moving upward, the melted resin MR can move along the shortest distance from the gate opening toward the mold surface OSM without being bent, as illustrated in FIG. 15B. Thus, the melted resin flows into the cavity, with the temperature of the melted resin hardly decreasing from the temperature of the melted resin stored in the resin nozzle 151. Thus, an area 155 of the mold surface OSM that is close to the gate opening is locally exposed to the flow of the melted resin that is injected with high temperature, continuously in a period of time from when the injection of the melted resin is started, until when the filling of the melted resin into the cavity is completed. As a result, even if the mold has a temperature adjustment mechanism, the temperature of the area 155 that is of the mold surface OSM, which forms an exterior surface of a molded resin component through transfer, and that is closest to the gate opening will reach a temperature equal to or larger than a glass transition point (Tg) of the resin material.

Consequently, as illustrated in FIG. 15C, in the mold surface OSM, when the gate is closed and the resin in the cavity is solidified, the transfer performance of surface shape (fidelity of transfer) of the mold surface OSM significantly differs between an area 162, which is closest to the gate exit, and an area around the area 162. Thus, the flatness (or surface roughness) significantly differs between an area 162 of the solidified resin SR and the other area around the area 162.

Figure 16:
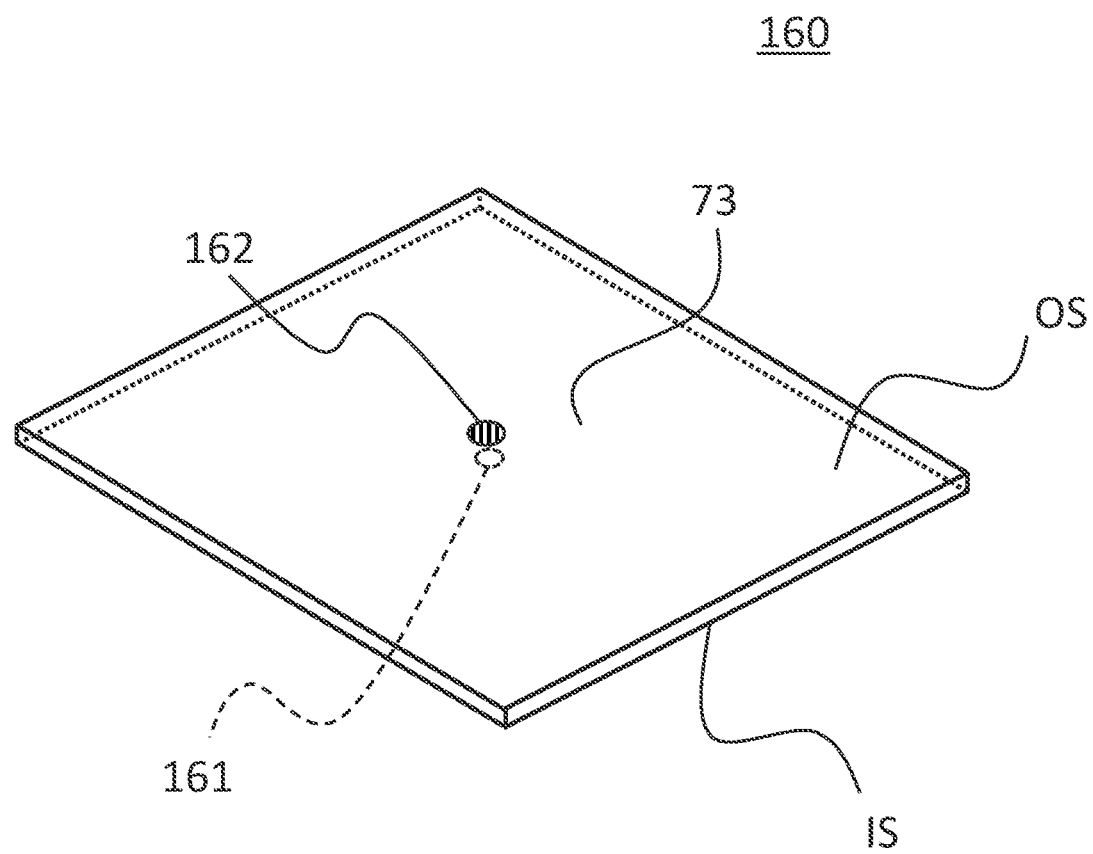
FIG. 16 is a perspective view of a molded resin component of the comparative example, viewed from an exterior surface OS side of the molded resin component.

FIG. 16 illustrates a molded resin component 160 of Comparative Example. FIG. 16 is a perspective view of the molded resin component 160, viewed from an exterior surface OS side of the molded resin component 160. On a non-exterior surface IS, a gate mark 161 is formed. In Comparative Example, since the area 162 of the exterior surface OS (73) had a surface flatness (or surface roughness) different significantly from that of an area around the area 162, the area 162 gave a feeling of gloss (or color) different from that of the area around the area 162. Thus, the exterior surface of the molded resin component formed had low quality.

As described above, in the molded resin components of Examples 1 to 4, the local area that gives a feeling of gloss (or color) different from that given by an area around the local area was suppressed from being formed in the exterior surface OS. Thus, the exterior surface formed had high quality. In contrast, in the molded resin component of Comparative Example, an area that gives a feeling of gloss (or color) different from that given by an area around the area was formed in the exterior surface opposite to a position at which the gate mark 161 was formed.

The present invention is not limited to the above-described embodiments and examples, and can be modified within the technical spirit of the present invention.

For example, one or two convex portions may be formed on a molded resin component, as in the above-described embodiments. In another case, a plurality of (i.e., three or more) convex portions may be formed on a molded resin component.

In addition, an existing injection molding apparatus may be used, and only the mold portion of the injection molding apparatus may be replaced with another mold portion. In addition, an existing injection molding apparatus may be used, and only the gate bush of the injection molding apparatus may be replaced with another gate bush.

A molded resin component to which the present invention is to be applied is not limited to a component of the multifunction printer illustrated in FIG. 17, and can be used for the exterior of various types of apparatuses, such as electrical apparatuses and mechanical apparatuses. Each of these apparatuses includes a functional component (an electrical component or a mechanical component) that achieves a function of the apparatus, and an exterior component that covers the functional component. Examples of the apparatuses include video apparatuses, audio apparatuses, office apparatuses, medical apparatuses, industrial apparatuses, transportation apparatuses, and analytical apparatuses. The exterior component covers the functional component such that the non-exterior surface is positioned between the exterior surface and the functional component. If a molded resin component of the present invention is used as an exterior component, the quality of external appearance of the apparatus can be increased.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Furthermore, the contents of disclosure in the present specification include not only contents described in the present specification but also all of the items which are understandable from the present specification and the drawings accompanying the present specification. Moreover, the contents of disclosure in the present specification include a complementary set of concepts described in the present specification. Thus, if, in the present specification, there is a description indicating that, for example, "A is B", even when a description indicating that "A is not B" is omitted, the present specification can be said to disclose a description indicating that "A is not B". This is because, in a case where there is a description indicating that "A is B", taking into consideration a case where "A is not B" is a premise.

This application claims the benefit of Japanese Patent Application No. 2021-105487, filed Jun. 25, 2021, which is hereby incorporated by reference herein in its entirety.

What is claimed is:

1. A method of manufacturing a molded resin component by using a manufacturing apparatus, the manufacturing apparatus including:

a first mold in which a flow channel of melted resin is formed and which is configured to form a first surface of the molded resin component;

a second mold configured to form a second surface of the molded resin component opposite to the first surface; and a valve pin configured to move forward and backward in a predetermined direction and open and close the flow channel, the method comprising:

injecting the melted resin from the flow channel into a cavity formed between the first mold and the second mold in such a manner that a portion of the first mold is located between a leading-end surface of the valve pin and the second mold in the predetermined direction; and separating the leading-end surface of the valve pin from the portion of the first mold when the flow channel is opened in such a manner that the portion of the first mold is positioned on an extension line of a central axis of the valve pin.

2. The method according to claim 1, further comprising:
causing at least a portion of the leading-end surface of the valve pin to abut against the portion of the first mold when the flow channel is closed,
wherein the portion of the leading-end surface of the valve pin includes the central axis of the valve pin.

3. The method according to claim 1, further comprising:
causing resin injected from a resin nozzle that houses the valve pin to reach a molding surface of the second mold after a flow direction of the resin is changed by the portion of the first mold.

4. The method according to claim 1, the second mold being a movable mold, the method further comprising:
moving the second mold, when the molded resin component is released from the first and the second molds, toward a direction in which the second mold is separated from the first mold, in a state where the flow channel is closed by the valve pin.

5. The method according to claim 1, further comprising:
causing the molded resin component to slide on a side surface of the valve pin when the molded resin component is released from the first and the second molds.

6. The method according to claim 1, wherein a side surface of the flow channel includes a portion inclined with respect to the predetermined direction.

7. The method according to claim 1, wherein a distance between the leading-end surface of the valve pin and the second mold when the flow channel is closed is equal to or larger than 2.5 mm and equal to or smaller than 15 mm.

8. The method according to claim 1, further comprising:
keeping a temperature of an area of a molding surface of the second mold below a glass transition point of a material of the molded resin component,
wherein the area faces the flow channel.

9. A method of manufacturing a molded resin component by using a manufacturing apparatus, the manufacturing apparatus including:

a first mold in which a flow channel of melted resin is formed and which is configured to form a first surface of the molded resin component; and a second mold configured to form a second surface of the molded resin component opposite to the first surface, the method comprising:

keeping a temperature of an area of a molding surface of the second mold below a glass transition point of a material of the molded resin component when the melted resin is injected from the flow channel into a cavity formed between the first mold and the second mold, wherein the area faces the flow channel.

* * * * *